(12) United States Patent
Chen et al.

(10) Patent No.: US 8,006,460 B2
(45) Date of Patent: Aug. 30, 2011

(54) FLOOR COVERING WITH INTERLOCKING DESIGN

(75) Inventors: Hao A. Chen, Chadds Ford, PA (US); John M. Whispell, Woodstown, NJ (US); Ji-Min Wan, Shanghai (CN)

(73) Assignees: Mannington Mills, Inc., Salem, NJ (US); Novalis Holdings Limited, Wanchai (HK)

( * ) Notice: Subject to any disclaimer, the term of this patent is extended or adjusted under 35 U.S.C. 154(b) by 481 days.

(21) Appl. No.: 12/181,604

(22) Filed: Jul. 29, 2008

(65) Prior Publication Data
US 2009/0031662 A1    Feb. 5, 2009

Related U.S. Application Data

(60) Provisional application No. 60/952,767, filed on Jul. 30, 2007.

(51) Int. Cl.
*E04B 2/46* (2006.01)

(52) U.S. Cl. ............. 52/592.1; 52/590.3; 52/591.2

(58) Field of Classification Search ............. 52/590.1, 52/588.1, 589.1, 177, 590.2, 590.3, 591.2, 52/592.1; 428/343, 354, 33
See application file for complete search history.

(56) References Cited

U.S. PATENT DOCUMENTS

| | | | |
|---|---|---|---|
| 2,008,575 A * | 7/1935 | Bussey | 52/420 |
| 3,870,591 A | 3/1975 | Witman | |
| 4,180,615 A | 12/1979 | Bettoli | |
| 4,195,107 A | 3/1980 | Timm | |
| 4,305,987 A * | 12/1981 | Scher et al. | 428/148 |
| 4,333,987 A | 6/1982 | Kwart et al. | |
| 4,393,187 A | 7/1983 | Boba et al. | |
| 3,120,083 A | 2/1984 | Dahlberg et al. | |
| 4,505,968 A * | 3/1985 | Ishii et al. | 428/172 |
| 4,507,188 A | 3/1985 | Chu | |
| 4,599,264 A * | 7/1986 | Kauffman et al. | 442/375 |
| 4,689,259 A * | 8/1987 | Miller et al. | 428/142 |
| 4,855,165 A * | 8/1989 | Bolgiano et al. | 427/393.5 |
| 5,458,953 A | 10/1995 | Wang et al. | |
| 5,494,707 A * | 2/1996 | Wang et al. | 427/412.1 |
| 5,627,231 A | 5/1997 | Shalov et al. | |
| 5,961,903 A | 10/1999 | Eby et al. | |
| 6,218,001 B1 | 4/2001 | Chen et al. | |
| 6,228,463 B1 | 5/2001 | Chen et al. | |
| 6,291,078 B1 | 9/2001 | Chen et al. | |
| 6,526,705 B1 | 3/2003 | MacDonald | |
| 6,555,216 B2 | 4/2003 | Chen et al. | |

(Continued)

FOREIGN PATENT DOCUMENTS

CN    1147050 A    4/1997

(Continued)

OTHER PUBLICATIONS

First Office Action received in corresponding Chinese Patent Application No. 200810082968.8 dated May 12, 2010, with English translation attached (19 pages).

(Continued)

*Primary Examiner* — Basil Katcheves
*Assistant Examiner* — Beth Stephan
(74) *Attorney, Agent, or Firm* — Kilyk & Bowersox, P.L.L.C.

(57) ABSTRACT

Surface coverings, such as floor coverings, with an interlocking design are described. Methods of making the surface coverings are further described.

34 Claims, 14 Drawing Sheets

U.S. PATENT DOCUMENTS

| | | | |
|---|---|---|---|
| 6,617,009 B1 * | 9/2003 | Chen et al. | 428/195.1 |
| 6,797,353 B1 | 9/2004 | Pacione | |
| 6,820,386 B2 * | 11/2004 | Kappeli et al. | 52/591.4 |
| 6,869,985 B2 | 3/2005 | Mohanty et al. | |
| 6,875,504 B2 * | 4/2005 | Malloy et al. | 428/323 |
| 7,155,871 B1 * | 1/2007 | Stone et al. | 52/591.4 |
| 7,185,473 B2 | 3/2007 | Pacione | |
| 7,194,843 B2 | 3/2007 | Pacione | |
| 7,243,469 B2 * | 7/2007 | Miller et al. | 52/311.1 |
| 7,257,929 B2 * | 8/2007 | Ceysson et al. | 52/403.1 |
| 7,383,663 B2 * | 6/2008 | Pacione | 52/120 |
| 7,849,655 B2 * | 12/2010 | Chen et al. | 52/592.1 |
| 2003/0093964 A1 * | 5/2003 | Bushey et al. | 52/592.1 |
| 2003/0131549 A1 | 7/2003 | Kappeli et al. | |
| 2004/0018333 A1 | 1/2004 | Chen et al. | |
| 2005/0166513 A1 | 8/2005 | Vanderhoef | |
| 2007/0175137 A1 | 8/2007 | Stone et al. | |

FOREIGN PATENT DOCUMENTS

| | | |
|---|---|---|
| DE | 10144801 A1 | 3/2003 |
| EP | 1323521 A1 | 7/2003 |
| EP | 1803869 A1 | 7/2007 |
| JP | 49-30420 | 8/1974 |
| JP | 52-49519 | 4/1977 |
| WO | 9934075 A1 | 7/1999 |
| WO | 0017467 A1 | 3/2000 |
| WO | 2005003574 A1 | 1/2005 |
| WO | 2007015860 A1 | 2/2007 |

OTHER PUBLICATIONS

"FINIfloor: De prefecte systeemvloer voor vinyl," Brochure with sample, two pages, no date.

"TNO Industrie en Techniek," two pages, 2005, with translation.

Notification of Transmittal of the International Search Report and the Written Opinion of the International Searching Authority; the International Search Report, and Written Opinion of the International Searching Authority issued for corresponding International Patent Application No. PCT/US2008/071446 dated Oct. 24, 2008 (18 pages).

* cited by examiner

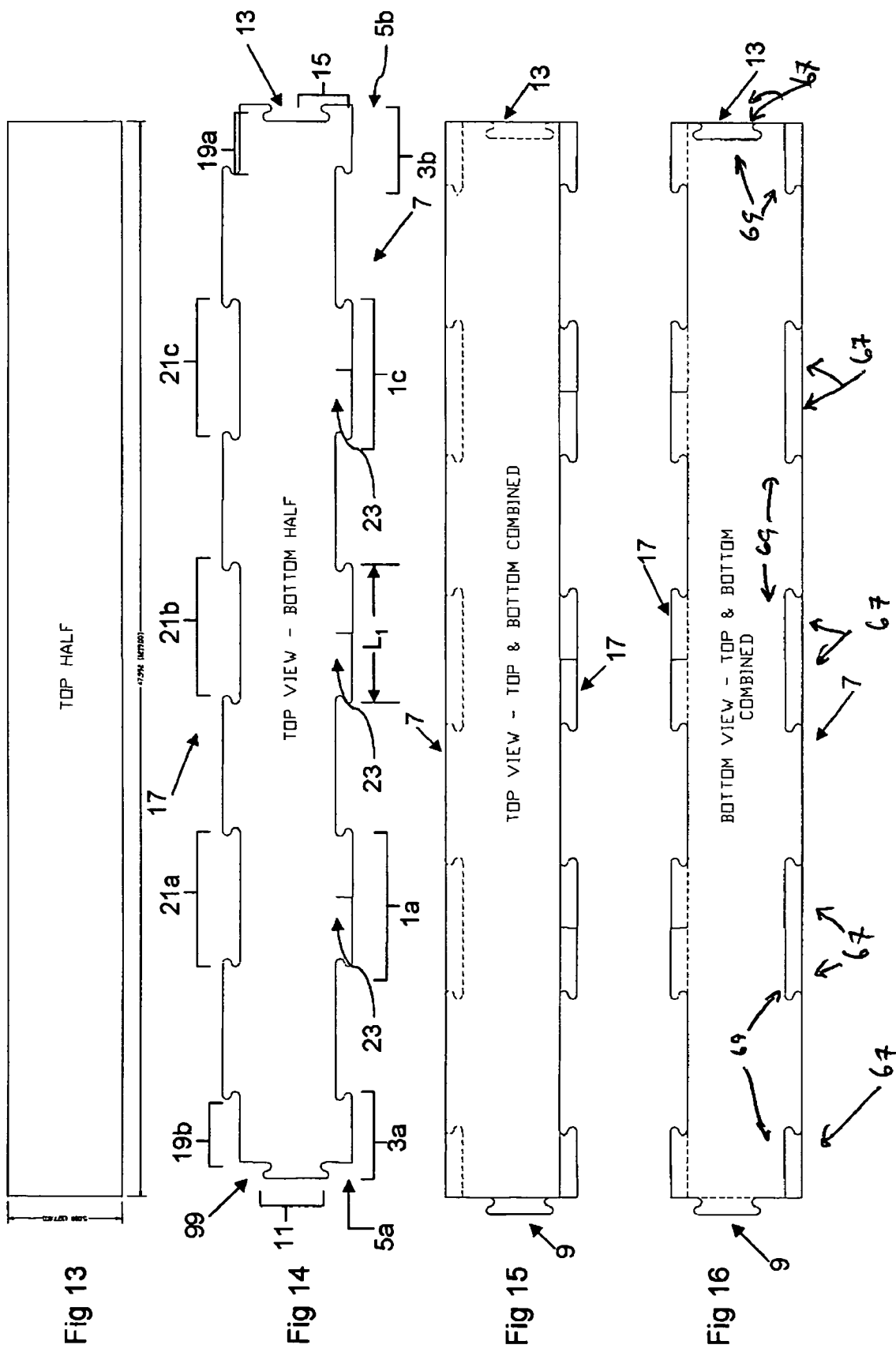

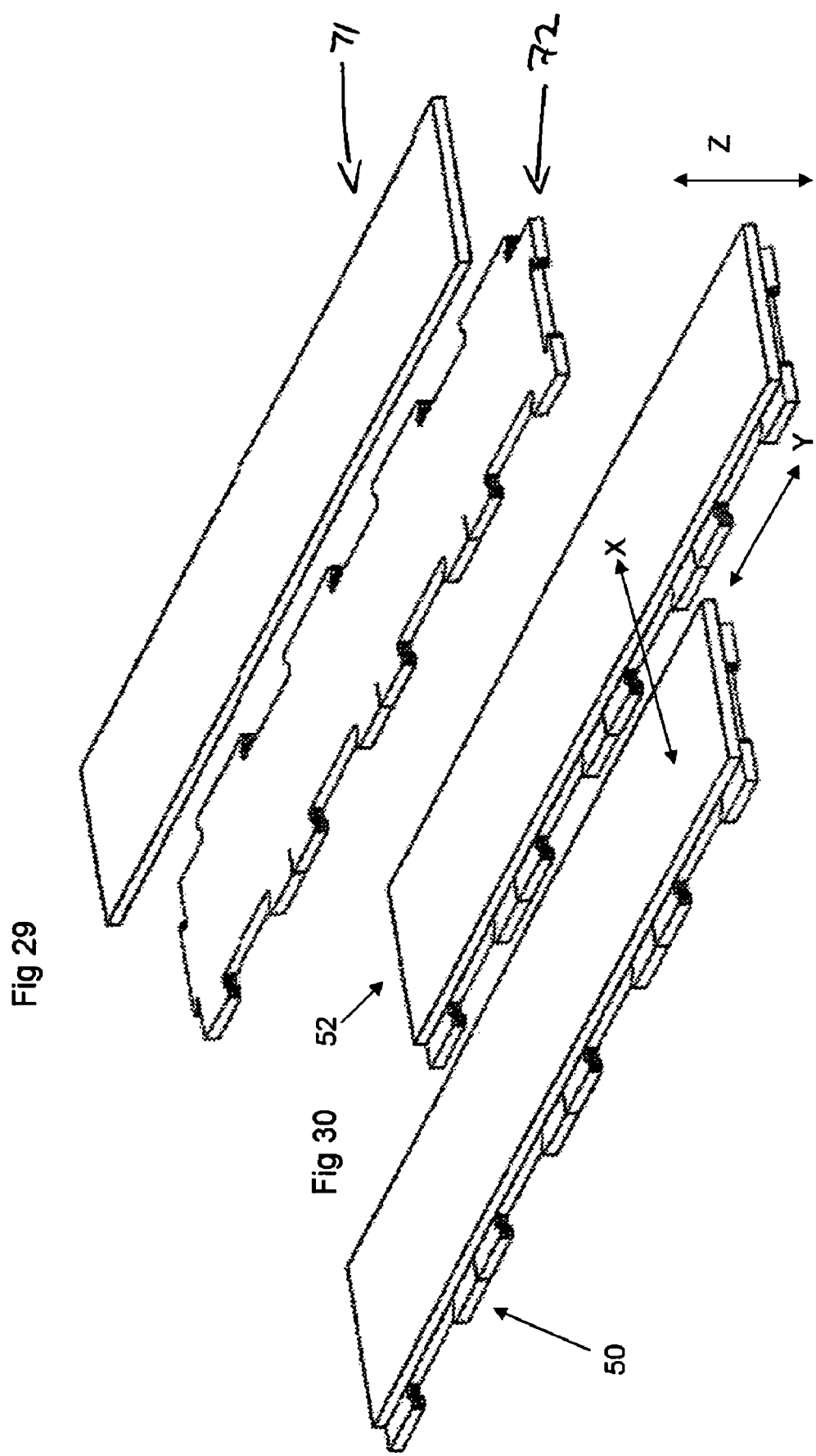

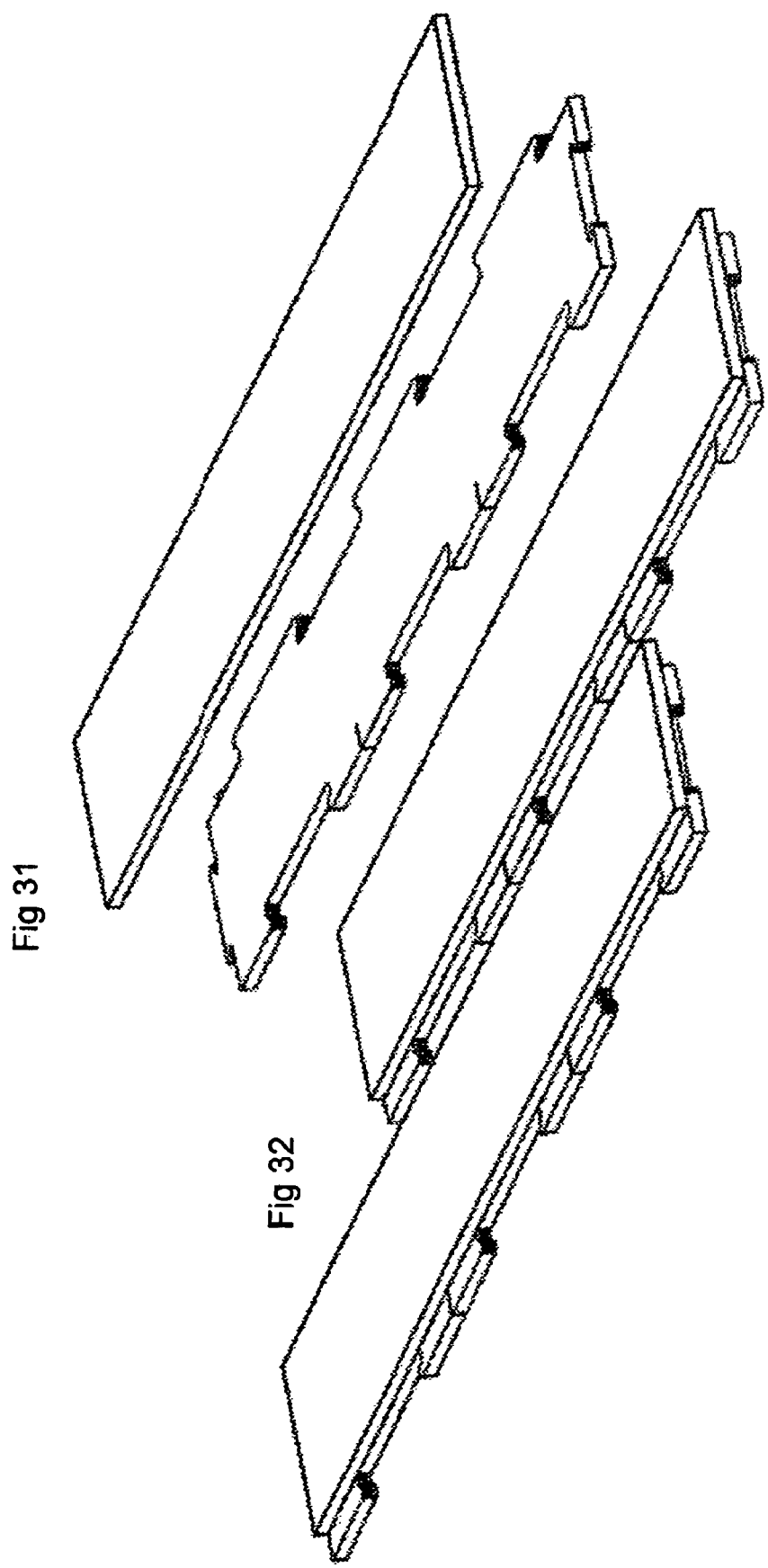

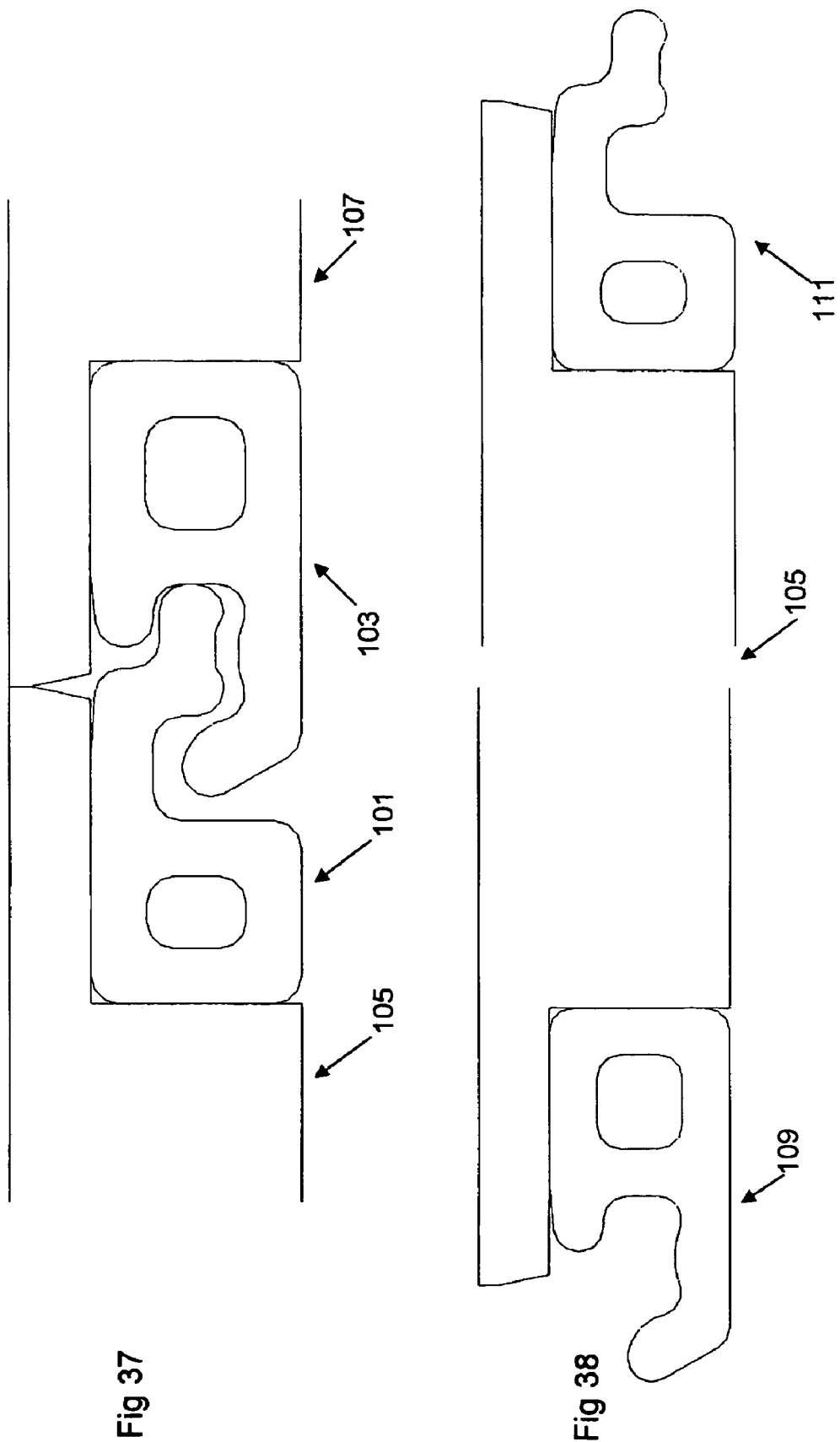

FLOOR COVERING WITH INTERLOCKING DESIGN

This application claims the benefit under 35 U.S.C. §119 (e) of prior U.S. Provisional Patent Application No. 60/952,767, filed Jul. 30, 2007, which is incorporated in its entirety by reference herein.

BACKGROUND OF THE INVENTION

The present invention relates to surface coverings including floor coverings. The present invention more particularly relates to surface coverings, such as floor coverings having an interlocking design to connect individual pieces of floor plank or tile together. The present invention further relates to methods of making the surface covering.

Current surface coverings, such as floor coverings, are typically laid down by placing an adhesive underneath the floor covering or on the sub-floor or on the underlayment in order to secure the floor covering. In resilient floor coverings, a large piece of resilient floor covering is typically cut in order to fit the dimensions of the room. The resilient floor coverings can often be 12-foot wide and can be any length, such as 12 feet, 20 feet, or longer. With this type of surface covering, it is necessary to adhere the resilient surface covering, such as vinyl flooring, to the sub-floor, underlayment or floor surface in order to keep the surface covering in place and also to achieve a surface covering that is level and does not curl. The installation process of using full-spread adhesive is very time consuming, costly, messy as well as cumbersome. For instance, an installer in general has to do the floor preparation first to remove all oil, dirt, grease, wax, sealers, paint, adhesives or any other substances that would hinder installation. In addition, the subfloor must be level without major pot holes or cracks; the conditions of the subfloor such as moisture content, structure soundness, etc., also have to be taken care of before the adhesive is applied. On the adhesive part, the selection of the right type of adhesive based on the type of subfloor is critical. The proper tools such as trowel type and its size are important for achieving the best economics and performance. After the adhesive is applied, it requires a proper opening time for the adhesive to develop its tackiness before the floor is put down. Any residuals of adhesive oozing up to the surface of the flooring need to be removed quickly before they set and adhere to the flooring surface. Furthermore, the adhesive cost can be quite expensive. The best advantage of the floating floor installation is that products can be directly installed on the existing floor materials without major prep work or removing the existing floor. This is a tremendous benefit for any subfloor for instance, having asbestos content, where any disruption of the subfloor structure can be extremely hazardous to the installer's health.

With all the reasons mentioned above, it should not be a surprise that the design of floating floors has recently become almost necessary as a surface covering. For instance, laminate flooring is used, wherein the laminate flooring typically is a rigid floor plank that can be joined together using a mechanical locking system, wherein one side of the floor plank has a tongue profile and the adjacent floor plank has a groove profile which permits the joining of the two through a mechanical locking system. While this mechanical laminate flooring system has gained great popularity in the United States, there are several problems with this type of flooring. First, the flooring can be extremely heavy since the core of the floor plank is typically made out of a wood-based material, such as high density fiber board. Further, this fiber board is typically not water resistant and also can be insufficiently resistant to even humidity changes. Thus, the laminate flooring can be limited where it is used since if the wood-based core got wet and swelled, this would damage the flooring and the laminate joined floor planks would actually separate. In addition, the laminate floor planks have received some complaints with respect to noise. In other words, persons walking on the floating floor made by such laminate planks have disliked the increased sounds from such a flooring surface compared to actual solid wood floors.

While some attempts have been made to provide flooring surfaces made out of vinyl that simulate floor planks, these designs have not addressed all of the problems associated with previous flooring products, such as the location of adhesives, failure to use mechanical locking systems, design features that permit easy joining of flooring planks together, and the like. The present invention overcomes these problems and provides a surface covering product that is easy to install, requires no adhesive on the underneath surface of the surface covering or sub-floor, is water resistant, and permits a floating floor that is relatively lightweight compared to laminate flooring and provides a walking surface that is more realistic to solid wood flooring, even from the standpoint of acoustic sounds.

SUMMARY OF THE PRESENT INVENTION

A feature of the present invention is to provide surface coverings, such as floor coverings, that are relatively lightweight.

A further feature of the present invention is to provide surface coverings, such as floor coverings, that are water resistant.

An additional feature of the present invention is to provide surface coverings, such as floor coverings, that can be mechanically joined and yet are relatively thin in thickness.

An additional feature of the present invention is to provide a surface covering, such as a floor covering, in the form of flooring planks or tiles that can be mechanically joined as well as chemically joined, for instance, through the use of adhesives.

An additional feature of the present invention is to be able to assemble a surface covering as simple as putting a puzzle together by lining up the leading edge of a new plank to the reference mark of the connected part of the adjacent plank.

Another feature of the present invention is the mechanical lock of the male and the female portion of the plank that builds in a tolerance for achieving an excellent fitting.

An additional feature of the present invention is a floor that can be re-positioned, removed or replaced without major efforts or destruction of the installed floor.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a floor plank comprising: a) a first sheet having multiple sides, such as four sides, the first sheet having an upper surface and a lower surface. The first sheet comprises at least one base layer, a print design located above the base layer, and at least one wear layer located above the print design. The floor plank further comprises b) a second sheet having multiple sides and having an upper surface and a lower surface, the upper surface of the second sheet being adhered to the lower surface of the first sheet; wherein two adjacent sides of the second sheet have multiple projections to interlock with recesses from at least one adjacent floor plank and two other adjacent sides have recesses to interlock with projections from at least one adjacent floor plank. The projections and recesses have a complementary shape to each other to be interlockingly engageable with corresponding recesses or projections on an adjacent floor plank or planks; wherein the multiple projections of the two adjacent sides of the second sheet extend beyond two adjacent sides of the first sheet and the recesses of the two other adjacent sides of the second sheet do not extend beyond the first sheet and are concealed by the first sheet; wherein at least a portion of the lower surface of the first sheet that is located directly above the recesses have at least one adhesive coating that permits adhesion of an upper surface of a projection from an adjacent floor plank or the upper surfaces of the projections have an adhesive coating or both, said portion of the lower surface and said upper surface of the projections have an adhesive coating which is the same or different.

The present invention further relates to a surface covering comprising a plurality of individual surface or flooring planks or tiles joined together and preferably in the form of a floating floor.

The present invention also relates to methods of making the surface coverings of the present invention.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention.

BRIEF DESCRIPTION OF DRAWINGS

FIGS. 1-40 are various schematic drawings depicting the surface coverings of the present invention or portions thereof from various views. The drawings are not to scale, but merely represent various design features of the surface coverings of the present invention.

DETAILED DESCRIPTION OF THE PRESENT INVENTION

Figure 1:
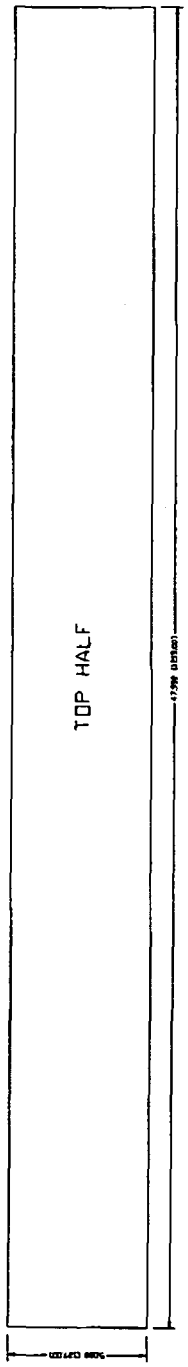

The present invention relates to surface coverings, such as floor coverings. The present invention particularly relates to surface coverings, such as floor coverings, having an interlocking design on at least two sides of the surface covering. The interlocking design permits the connecting of individual pieces of planks or tiles together in length and width directions to form a surface covering, such as a monolithic surface covering, without the need for any installation adhesive underneath to hold the product together and, further, preferably requires minimum preparation work for the sub-floor or sub-surface. The interlocking system used in the present invention generally involves a mechanical lock system combined with a chemical lock system (e.g., adhesive) to provide a durable locking and holding of the floor surface. The mechanical locking system can be visible with respect to the projections, also known as the "giving part," and an invisible (in other words, not visible when looking from the top or walking surface of the surface covering), a "receiving part," which is also known as recesses. The projections and recesses are located parallel to each other on both sides or edges of the surface covering to achieve near-perfect or perfect alignment. The projections of the mechanical lock can be any geometrical design or any shape, and this projection extends outward from the edge or side of the plank or tile to have an appropriate width and length. The thickness of the projections is preferably half of the total thickness of the overall plank or tile, but can be more or less. The recesses or receiving part of the mechanical lock system can be a mirror image cut-out of the projection portion. Preferably, as an option, the size of the recesses can be slightly larger than the projections to allow an easier interlocking of the projections into the recesses. The edge of the cut-out or recesses is lined up, preferably, precisely to the opposite edge or side having a projections as shown in the Figures. The thickness of the receiving part or recess can be identical (or nearly identical) to the projection thickness, so that once they are connected together, there is no ledge or ridge formed. Preferably, at least one part of the mechanical locking system has an adhesive applied onto its surface. Preferably, the adhesive is on the receiving cut-out side. This is advantageous since the receiving cut-out side or recesses are hidden from view, when viewing from the top walking surface and, therefore, a person handling the plank during installation can avoid directly contacting the adhesive surface, which can be sticky. Further, by such design, there is no need to have a protective release film on the adhesive surface to avoid contamination or messiness due to inadvertently touching the adhesive. As stated, the interlocking design of the present invention permits easy installation. To connect the planks together, a motion, similar to putting a puzzle together, can be used. One plank can be connected to the other from end-to-end and then side-to-side to cover the entire surface of the room.

In more detail, the surface covering of the present invention can be any surface covering, such as a floor covering, wall covering, and the like. The surface covering can be used essentially in any room in a house or work environment, including the kitchen, bathroom, living room, dining room, recreation room, garage, and outside living spaces, such as a porch, deck, and the like. The surface coverings of the present invention can be used in an inside or outside environment, especially since the surface coverings of the present invention are water resistant and do not swell when wet. In fact the thickness swell of the surface coverings of the present invention is negligent (e.g., zero or zero to less than 0.01 mm or 0.0001 mm to less than 0.001 mm) when tested at LF 3.2 of NALFA LF 01-2003.

For purposes of the discussion below, the preferred embodiment, floor planks or floor tiles are described. However, it is realized that this description equally applies to surface coverings in general. Furthermore, while the term "floor plank" is used, it is to be understood that floor plank includes any geometrical design, especially designs having four sides, and the four sides can be rectangular, including squares, and can be any length or width such that the floor plank can serve as an elongated, rectangular floor plank or can be floor tile, which can be square or a rectangular shape of modular tile format. The present invention is not limited by any length or width, nor any geometrical design.

In more detail, the present invention relates to a floor plank comprising: a) a first sheet having multiple sides, such as four sides. The first sheet has an upper surface and a lower surface and the first sheet comprises at least one base layer, a print design located above the base layer, and at least one wear layer located above the print design. The floor plank has b) a second sheet having multiple sides and having an upper surface and a lower surface. The upper surface of the second sheet is adhered to the lower surface of the first sheet; wherein two adjacent sides of the second sheet have multiple projections to interlock with recesses from at least one adjacent floor plank and two other adjacent sides have recesses to interlock with projections from at least one adjacent floor plank; wherein the projections and recesses have a complementary shape to each other to be interlockingly engageable with corresponding recesses or projections on an adjacent floor plank; wherein the multiple projections of the two adjacent sides of the second sheet extend beyond two adjacent sides of the first sheet and the recesses of the two other adjacent sides of the second sheet do not extend beyond the first sheet and are concealed by the first sheet. At least a portion of the lower surface of the first sheet that is located directly above the recesses has at least one adhesive coating that permits adhesion of an upper surface of a projection from an adjacent floor plank. Or, the upper surfaces of the projections can have an adhesive coating or both, the portion of the lower surface and the upper surface of the projections can have an adhesive coating which is the same or different.

The floor plank can have one side having at least two full projections and at least two separated partial projections on that same side. One of the partial projections can be located at each adjacent corner of that side. For instance, referring to FIG. 2, 1A-1C identify examples of three full projections wherein A1, by itself, 1B, by itself, and 1C, by itself, are individual full projections, meaning they are not partial. Furthermore, in FIGS. 2, 3A and 3B each refer to partial projections, and as can be seen, 3A is at adjacent corner of one side and 3B is at the other adjacent corner on the same side, wherein the adjacent corners are identified as 5A and 5B, and the one side is identified as 7. It is noted that FIG. 2 is a figure of only the second sheet without it being shown connected to the first sheet to form the overall floor plank.

The floor plank on one other side can have a total of one projection and, on a third side, can have a total of one recess. More than a total of one projection and/or recess is possible. In FIG. 2, the side having a total of one projection is shown as side 9, and the projection is identified as 11. Further, in FIG. 2, side 13 is considered an example of the third side having a total of one recess 15.

The floor plank has a fourth side that can have at least two full recesses and at least two separated partial recesses, wherein each of the partial recesses are located at an adjacent corner of the fourth side. In FIG. 2, the fourth side is identified as 17. The partial recesses are identified as 19A and 19B. The full recesses are identified as 21A, 21B, and 21C. As can be seen, the projections on side 7 and the recesses on side 17 are located directly opposite of each other and are parallel to each other to permit perfect alignment when planks are joined together. By having equally spaced recesses and projections and with the projections and recesses being directly opposite each other, this permits the joining of flooring planks that can be staggered to provide a more dimensionally stable connected flooring surface and to also simulate the joining of solid wood planks.

Figure 2:
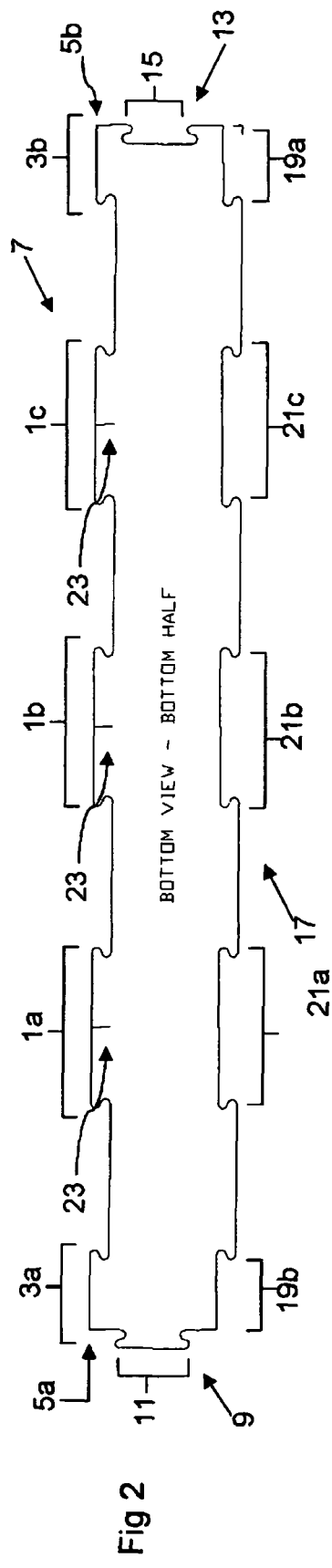

The floor plank can have a rectangular shape, for instance, as shown in FIG. 1 and FIG. 2, as well as FIG. 15, which shows the first sheet and second sheet combined to form the floor plank. It is noted, for instance, referring to FIG. 2 and FIG. 15, that technically with the presence of recesses and projections, the overall floor plank is not rectangular due to these additional surfaces. It is noted that the first sheet of the floor plank is rectangular and that the second sheet has multiple sides. In FIG. 15, side 7 and side 17 would be the opposing long sides, and sides 9 and 13 would be the opposing short sides, when compared to each other.

The floor plank can be essentially a rectangle having two opposing long sides, for instance, in FIG. 15, sides 7 and 17 and two opposing short sides, for instance, in FIG. 15, sides 9 and 13, wherein the two opposing short sides are the second and third sides referred to above, wherein the second side has one projection and the third side has one recess as indicated, referencing FIG. 2 above.

The floor plank, as mentioned above, can have projections and recesses having a complimentary shape to each other so as to be interlockingly engageable with corresponding recesses or projections on an adjacent floor plank(s). Interlockingly engageable can be a mechanical interlock between two adjacent floor planks, such as to prevent horizontal movement of the floor plank in two directions that are perpendicular to each other and wherein the two directions are parallel to the plane of the upper surface of the floor plank. This can be shown, for instance, in FIG. 30, which shows two floor planks that are not connected together yet, but are about to be connected together. In FIG. 30, an example of horizontal movement of the floor planks in two directions that are perpendicular to each other would be the directions indicated as "x" and "y" in FIG. 30, which are two directions that are perpendicular to each other and these directions are parallel to the plane of the upper joined surfaces of the two planks shown and identified as 50 and 52. The direction "z" is simply shown to represent the vertical surface, which would be perpendicular to the "y" axis and "x" axis. As explained further below, the use of adhesive on the projection upper surface or the lower surface of the recess or both would prevent substantial movement in the "z" direction as shown in FIG. 30.

The upper surface (or a layer that forms part of the first sheet) of the first sheet of the floor plank can have texture that optionally is in register with the print design. The texture can be created by mechanical embossing or other embossing techniques known to those skilled in the art. The texture embossed, preferably in register with the print design, will resemble, in the case of a wood design, the grains of the wood, wood knots, and the like. When the print design is ceramic, the texture will simulate the texture of a ceramic tile surface. The depth of the embossing on the upper surface can be from about 0.5 mil to about 15 mil. The embossing depth can vary throughout the entire upper surface depending upon the features that are being simulated to be in register with the print design. Further, it is possible that the texture simulate a bevel edge found in, for instance, wood flooring, and this texture can be in register with a print design that simulates the space between two joined pieces of wood. With respect to the upper surface and the texture present, the texture can be present on the print design layer, and/or can be present on a wear layer (s). The wear layer can be one or more layers, and can comprise more than one layer, such as a layer known as a wear layer and a protective layer (e.g., top coat layer or wear top coat layer(s)), or other layers, such as a strengthening layer. Any one or more of these layers can be embossed to have texture. In addition, it is possible to emboss the base layer of the first sheet or the optional second base layer of the first sheet.

As an option, each recess or cut-out can define a surface area and each projection can define a surface area, wherein this surface area is the same or nearly the same, such as within +/−5% or within +/−1% or within +/−0.5% or within +/−0.1% of each other. In the alternative, the recess can have a surface area that is larger than the surface area defined by the projection. For instance, the surface area defined by the recess can be from 1% to 10% larger than the surface area defined by the projection or it can be from 1% to 5% larger than the surface area defined by the projection. When the recess has a larger surface area than the projection, this permits forgiveness when the projection is interlocked into the recess, since it will not require an exact alignment in order for the projection to fit into the recess which makes the installation much easier. Thus, this larger surface area of the recess, compared to the projection, is not only related to machine tolerance, but can also be optionally related to simply building an additional tolerance just for ease of installation. Even with this slightly larger surface area in the recess compared to the projection, a relatively tight fit can be achieved to prevent horizontal movement of the floor plank as described above and provide a mechanical locking of the floor planks when connected together.

Figure 4:
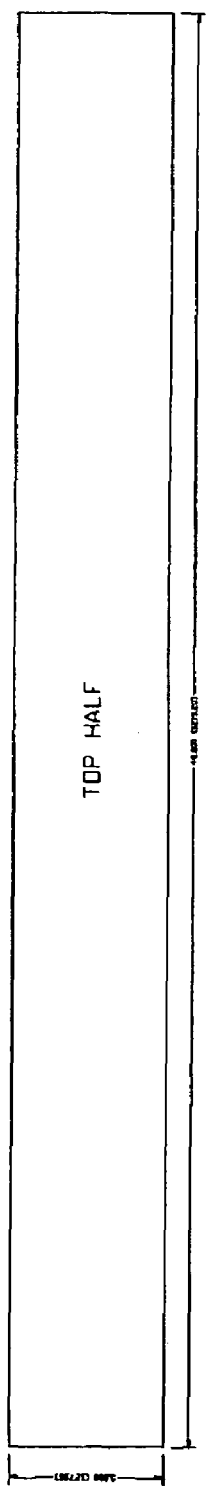

The projection can have any length, such as from 1 inch to 8 inches or more, for instance, from 3 to 5 inches or from 5 to 7 inches (e.g., 5 inches, 6 inches, 7 inches plus/minus ¼ inch), and the like. The overall length of the projection can be identified as L1 in FIG. 4. This reference to FIG. 4 is just to show how the length of the projection would be measured.

Figure 8:
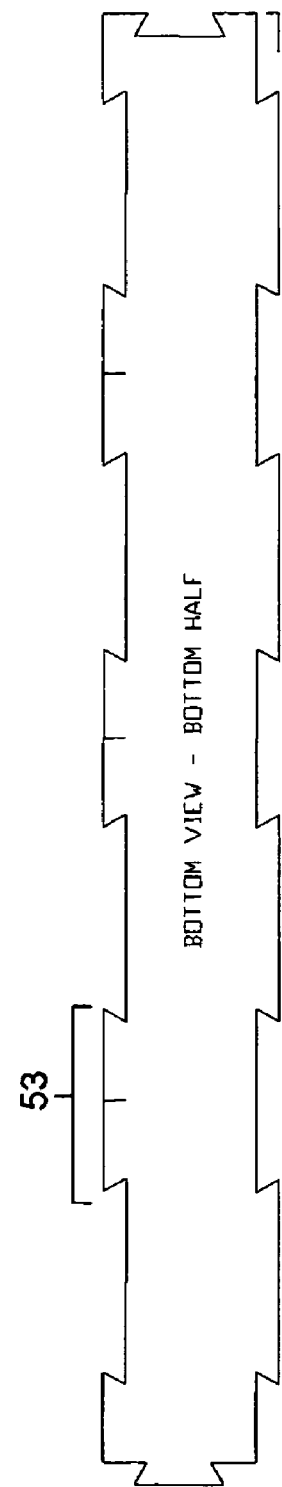
Figure 9:
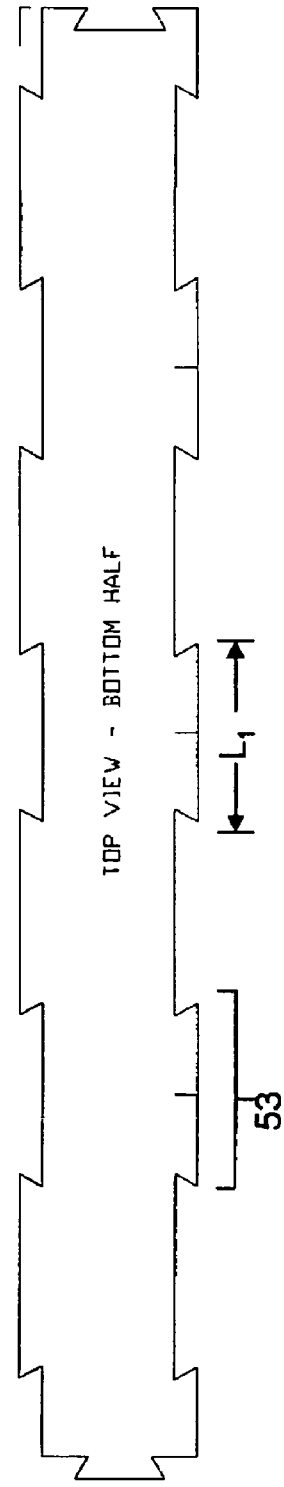

The projection, as well as the cut-out, can have any geometrical shape. For instance, as shown in FIG. 3 or FIG. 2, 1A, 1B, or 1C, the projection can have a dove-tail shape. Other shapes can be possible, such as interlocking finger joints, such as shown in FIGS. 2, 1A, 1B, and 1C, or in FIG. 3. Some would consider these finger joints to be considered dove-tail. A more linear dove-tail design is shown, for instance, in FIG. 8 projection 53. Again, other geometrical shapes can be used, especially geometrical shapes that would permit the floor planks to be interlocking to form a mechanical interlock and, preferably, to prevent horizontal movement of the floor plank in two directions that are perpendicular to each other, wherein the two directions are parallel to the plane of the upper surface of the floor plank as explained previously and as shown in FIG. 30.

The print design located above the base layer can be any print pattern or design resembling natural floor surfaces, natural wall surfaces, and the like. For instance, the print design can resemble natural wood or planks of natural wood. The design pattern can simulate ceramic surfaces, brick, stone, and the like. The print design can simulate the design/pattern of natural wood, stone, marble, granite, ceramic, or brick appearance, and the design can include one or more joint or grout lines or borders. The print design can be any artistic design/pattern simulating a natural surface or a man-made surface or other non-natural design such as found in tiles, resilient flooring, and the like. The print layer and/or the wear layer can be mechanically and/or chemically embossed or otherwise embossed with a surface texture, such as a surface resembling a wood, stone, marble, granite, ceramic or brick surface, to correspond in register with the print design.

The print design can be in the form of a separate layer, or can be a design that is directly printed on the surface of the base layer(s) or other layer(s), through digital or analog printing techniques. The print design can be pre-printed before being applied onto the base layer or other layer, or can be printed afterwards. For instance, an inkjet printer or laser printer can print a design directly on the base layer or on a layer located on or above the base layer. In the alternative, the print design can be on a separate décor layer, which can be a cellulose base or plastic base layer, such as paper or film or sheet, which can optionally be saturated with one or more resins. Essentially, the print design can be on any separate layer capable of receiving a design or it can be directly printed on one of the surfaces of the floor plank, such as the base layer.

The print design can be in the form of a print layer that can be affixed to the top surface of the base layer or other layer, wherein the print layer has a top surface and a bottom surface. The print layer preferably is plastic or polymeric film such as PVC, vinyl containing polymer, olefin polymers, acrylic containing polymer, polyester, ionomer and/or other alloy film etc. A resin (or resin containing) film or sheet can be used. Preferably, the print layer has a printed design. The printed design can be any design which is capable of being printed onto the print layer, such as ones described above. The print layer is also known as a decor print layer. The print layer can be prepared by rotogravure printing techniques or other printing means such as digital printing. Once the film has the design printed on it the film can be laminated such that it is located wherein the wear layer is on the top and the base layer is on the bottom.

Figures 33, 34:
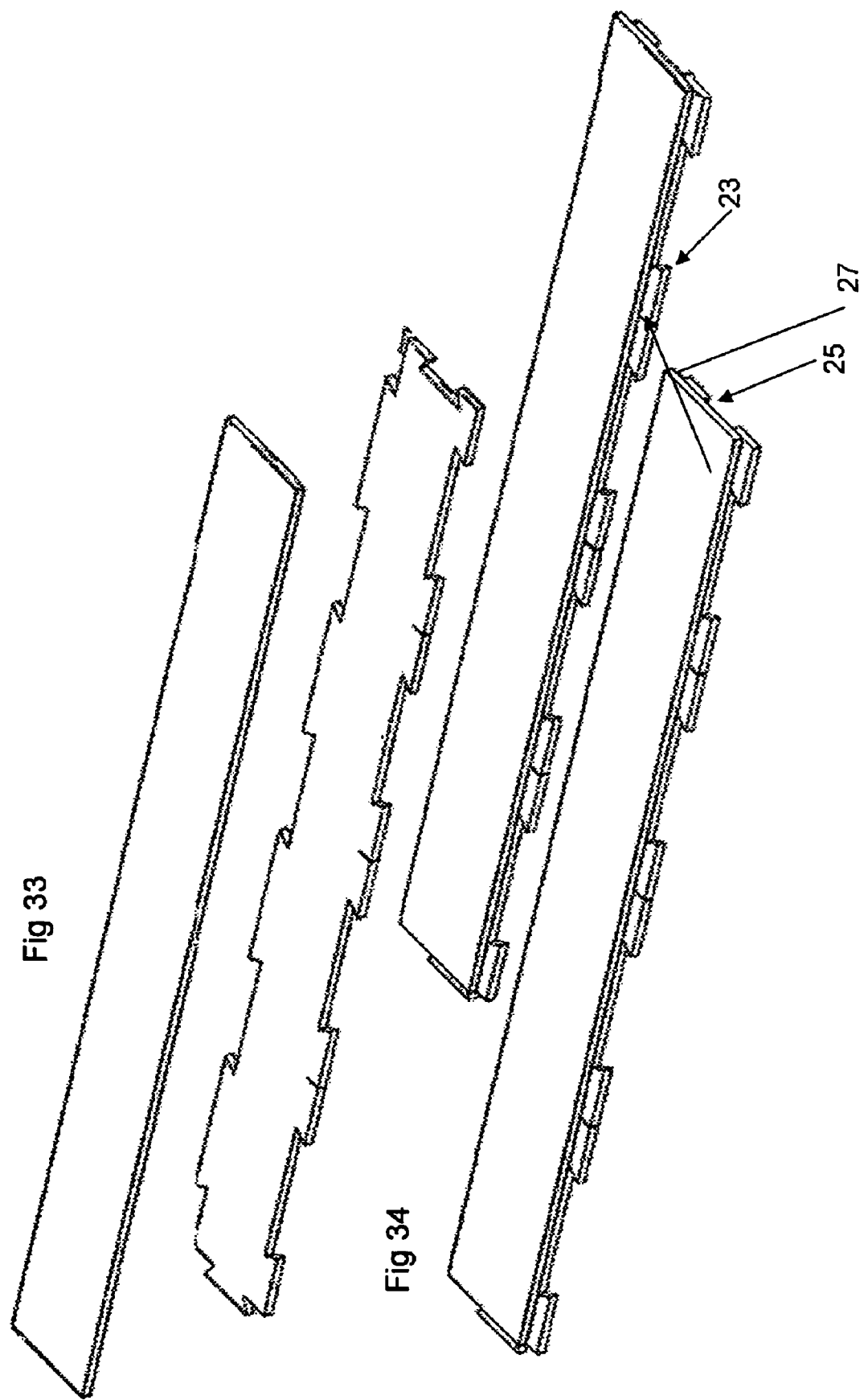

One or more projections of the floor plank can contain a visible aligning mark (e.g., center aligning mark) which is on one or more projections. This visible aligning mark permits one to align the interlocking of adjacent floor planks in an easy fashion. In FIG. 2, the aligning marks are shown as 23, and this is also shown in FIG. 34. The visible aligning mark can be located in the center of the length of the projection, or can be located offset from the center as long as the aligning mark is consistently located at that particular position for that series of floor planks. Preferably, the aligning mark is a center aligning mark or near center. For purposes of the present invention, the term "center" means center or near center. The aligning mark itself can be any visible mark that can be visually identified or identified by touch. The aligning mark can be a single line, for instance, as shown as 23 in FIG. 2, or it can be any other shape or size. The aligning mark can be printed on the projection through the use of ink, or can be a mark that is on a separate layer and adhered onto the projection, such as a sticker. The aligning mark can be a line created by putting a scratch line or other symbol on the projection, such as with a knife or laser. The aligning mark can be a partial or full slit in the projection. As better shown in FIG. 34, which shows two flooring planks about to be joined or interlocked, the aligning mark is best used when planks are interlocked in an offsetting position and the short edge, 25, is brought into alignment with the aligning mark 23 as shown by the movement arrow 27. Essentially, this interlocking can use one of the partial recesses in an adjacent corner of the floor plank, for instance, 19A in FIG. 2, and interlock into about half of the fill projection so that the remaining half of the full projection can receive a third interlocking plank. The aligning mark makes it quite easy for an installer to locate and align the partial recess to the projection and leave sufficient room for an adjacent plank to be interlocked into place as well, with another partial recess of a third plank into the remaining exposed portion of the projection.

The projections can comprise structures adapted to mechanically lock the floor plank to adjacent floor planks having corresponding engagement elements. The engagement elements and the projections can comprise a structure of any shape or size to provide the mechanical locking of the floor plank to adjacent floor planks.

Figure 39:
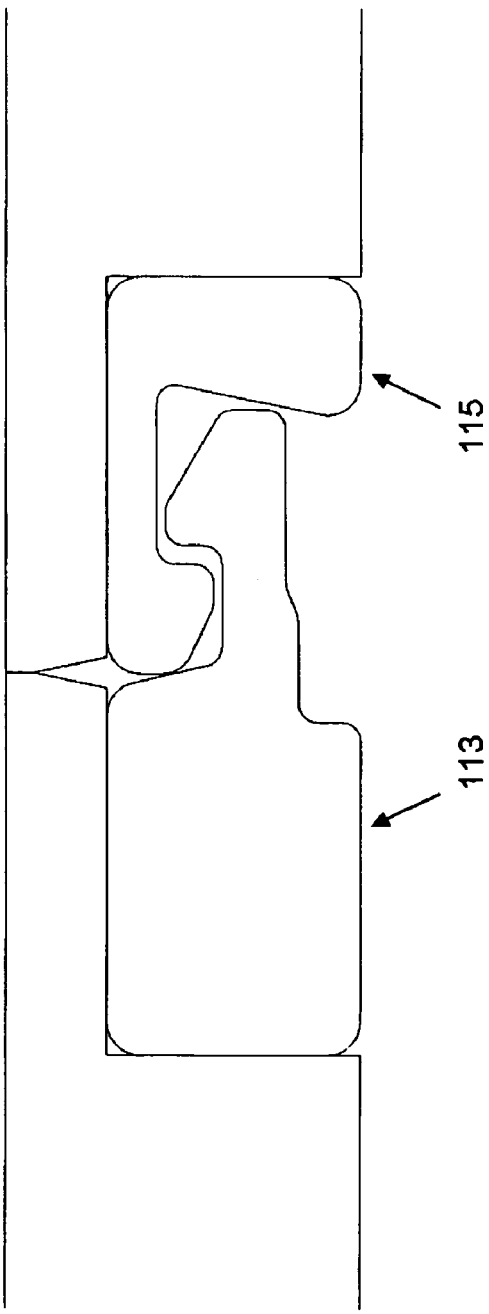
Figure 40:
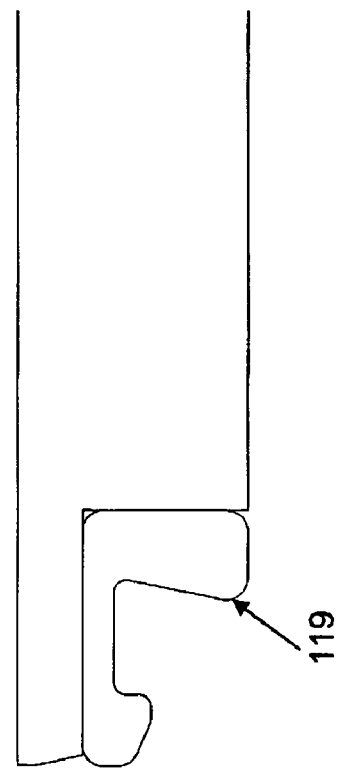

The projections can be unitary with the second sheet. In other words, the projections can be part of the overall second sheet and are formed by cutting out the desired shapes of the projections and recesses. For instance, see FIG. 2. It is possible that the second sheet can be formed in a mold so that no cut-outs are necessary. As an option, the projections or recesses or both can be separately attached to the second sheet or to any other part of the floor plank. For instance, instead of cut-outs or molds that form the projections or recesses, one can use separate attachments that are connected or adhered onto the floor plank, such as the second sheet, which then serve as the projection and/or recess. For instance, as shown in FIGS. 37-40, the separate attachments 101 and 103 can be attached onto the sides of plank 105 and 107. Examples are also shown in FIGS. 38-40, as 109, 111, 113, 115, 117, and 119. In the alternative, a floor plank can receive the separate attachments in order to form the projections and recesses necessary to connect planks together to form a floating floor. These separately attached projections and recesses can be made from the same or different material as the first sheet or second sheet. The projections or recesses can be made from rigid material, flexible material, or semi-rigid material. The material can be made from cellulose-based material, polymer-based material, and the like.

The thickness of the first sheet can be any desired thickness, and this can be dependent on the desired use. The thickness of the first sheet can range from 1 mm to 3 mm, such as from 1.5 mm to 3 mm or from 1.75 mm to 2.5 mm, and can be greater than 3 mm in thickness. The second sheet can range from 1 mm to about 2.5 mm, such as from 1 mm to 2 mm or amounts above or below these ranges. The overall thickness of the floor plank can also vary. For instance, the thickness can range from 2 mm to 6 mm or higher, such as from 2 mm to 5 mm or from 3 mm to 4 mm.

The floor plank can be water resistant. In other words, the floor plank can be used indoors or outdoors. Further, the floor planks are resistant to various chemicals and detergents and, therefore, can even be used in industrial, recreational, or garage environments. For instance, the floor planks are water resistant such that they will not swell by immersing the material in the water for 24 hours or longer.

The floor planks are preferably flexible and are preferably not rigid. In other words, the floor plank bends or bows significantly if the plank is held at one edge. This flexibility is quite advantageous when installing the planks, since it will conform to any imperfections in the sub-floor or floor that it is being installed upon. The floor plank can have one or more of the following mechanical properties:

1. Tensile strength (psi)—ASTM D638: 750 psi +/−55 psi;
2. Elongation (%)—ASTM D638: 34+/−9;
3. Break Load (lbf)—ASTM D638: 31+/−1.5;
4. Flexural Force @ 0.3" (lbf)—Modified ASTM D790: 1+/−0.35;
5. Pneumatic Indentation at 3000 psi (inch)—<0.005; and/or
6. Residual Indentation at 750 psi (inch)—ASTM F-970: <0.002.

Preferably, the floor plank has two or more, three or more, four or more, five or more, or all six of these parameters, in any combination.

The floor plank can have one or more of the following de-lamination properties: a de-lamination force between the first sheet and second sheet based on modified ASTM D3164 having a shear bond (lbf): 30+/−6 and/or a peel bond (lbf): 4.5+/−0.5. Preferably, the floor plank has both of these de-lamination properties.

The floor plank can have a joint strength when two planks are interlocked together based on a modified ASTM-D-3164, of:

1. Adhesive bond (1" sample—lbf): 11+/−4;
2. Mechanical & adhesive bond (full side Lock—lbf): 50+/−18;
3. Mechanical & adhesive bond (full end Lock—lbf): 33+/−15; and/or
4. Partial mechanical & adhesive Bond (1" sample—lbf): 7+/−2.

Preferably, the floor plank has at least one of these properties, at least two of these properties, at least three of these properties, or all four of these properties, in any combination.

The floor plank can have one or more of the following surface properties:

a. Taber Abrasion—NAFLA 33.13 LF01-2003-Wear 3.7: >350 cycles;
b. Scratch resistance by fine steel wool—not visible;
c. Scuff by sneaker sole—no scuff mark;
d. Stain property—Modified ASTM 925: 0-3 (no stain—strong stain):
   i. Food stainants: 0
   ii. Asphalt sealer: 0
   iii. Oil dye: 1
   iv. Shoe Polish: 1
   v. Blue Sharpie Marker: 1
   vi. Fertilizer: 0
   vii. Iodine: 3;
e. Heat & light stability—ASTM 1514 & 1515: Delta E<3; and/or
f. C.O.F (dry neolite sole)—ASTM C1028: >0.6.

Preferably, the floor plank has at least one of these properties, at least two of these properties, at least three of these properties, at least four of these properties, at least five of these properties, or all six of these properties, in any combination.

The floor plank can have any combination of the properties, as well as other parameters. The floor plank can have each of the mechanical properties, de-lamination properties, joint strength properties, surface properties, or one, two, or three of these properties in any combination. Thus, the floor plank can selectively have various properties.

The first sheet can further comprise a second base layer located below and adhered to the base layer. This second base layer can be bonded or otherwise adhered to the first sheet through pressure and/or heat, such that the second base layer can be not separately identifiable from the base layer when viewed from the edge of the first sheet. The base layer and/or second base layer and/or the second sheet can comprise at least one polymer, such as a polyvinyl chloride or other polymer or a combination of polymers. The polymer can be a homopolymer, copolymer, terpolymer, and the like. For purposes of the present invention, one or more polymers can be present in any layer and/or sheet. The polymer can be a rubber, thermoplastic polymer or a thermosetting polymer. Further, the polymer can be a homopolymer, copolymer, terpolymer, and/or a polymer containing any number of different repeating units. Further, the polymer can be any type of polymer, such as a random polymer, alternating polymer, graft polymer, block polymer, star-like polymer, and/or comb-like polymer. The polymer can be one or more poly-blends. The polymer can be a thermoplastic elastomer (TPE), an interpenetrating polymer network (IPN); simultaneous interpenetrating polymer network (SIN); or interpenetrating elastomeric network (IEN). Specific examples of polymers include, but are not limited to, linear-high polymers such as polyethylene, poly(vinylchloride), polyisobutylene, polystyrene(s), polycaprolactam (nylon), polyisoprene, and the like. Other general classes of polymers which can represent the polymers present in the polymeric product of the present invention are polyamides, polycarbonates, polyelectrolytes, polyesters, polyethers, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), fluoropolymers, ionomeric polymers, polymers containing ketone group(s), liquid crystal polymers, polyamide-imides, polymers containing olefinic double bond(s) (such as polybutadiene, polydicyclopentadiene), polyolefin copolymers, polyphenylene oxides, polyurethanes, thermoplastic elastomers and the like. The polymer present in the polymeric product of the present invention can be a polyolefin or polyethylene, more preferably, polymers of alpha olefins dereived from ethylene, 1-butene, propylene, 1-hexene, 1-octene, 4-methyl-1-pentene and substituted alpha-olefins and the like, copolymers of: ethylene, 1-butene, propylene, 1-hexene, 1-octene, 4-methyl-1-pentene and substituted alpha-olefins and the like, and terpolymers comprised primarily of ethylene, 1-butene, propylene, 1-hexene, 1-octene, 4-methyl-1-pentene and substituted alphaolefins and the like. Preferably, the molecular weight of the polymer is from 100,000 to 200,000, based on weight average molecular weight. In one or more embodiments, the print layer and/or wear layer and/or any other layer can contain or be made from one or more of the above-identified polymers or materials.

The base layer can comprise at least one polymer, such as a polyvinyl chloride, at least one plasticizer, such as DINP, at least one filler (e.g., calcium carbonate, carbon black, wood flour, metal carbonates, talc, clay, kaolin, wollastonite, gypsum), or post industrial recycled or post consumer recycled materials such as gypsum, wood, carpet or parts thereof, PVC, VCT recycled, and the like. The base layer can include at least one heat stabilizer, such as mixed metals including barium-cadmium, calcium-zinc, barium-zinc, other zinc compounds and straight zinc complexes, and the like. Other ingredients (for instance, in conventional amounts) can be present in the base layer or other layers of the first sheet and/or second sheet, such as flame retardants, UV stabilizers, wear resistant particles, antimicrobial additives, pigments, processing aids, dispersion additives, and/or lubricants, and the like.

The second base layer can comprise the same or different components as the base layer and can be selected from the same list of possible components as mentioned above. To avoid repetition, these ingredients are not re-listed here.

The base layer can comprise from 15 wt % to 30 wt % polymer, such as polyvinyl chloride, from 4 wt % to 10 wt % plasticizer, from 50 wt % to 80 wt % filler, and/or from about 1 wt % to 5 wt % stabilizer. More than one polymer, more than one plasticizer, more than one filler, and/or more than one stabilizer type can be used. These weights are based on the weight of the base layer.

The second base layer can comprise from 25 wt % to 40 wt % polymer, such as polyvinyl chloride, from 7 wt % to 15 wt % plasticizer, from 40 wt % to 60 wt % filler, and from 2 wt % to 10 wt % stabilizer. These wt % are based on the weight of the second base layer. As stated, this layer and/or second base layer can comprise other optional ingredients and can contain more than one component in each category, such as more than one polymer, more than one plasticizer, more than one filler, and/or more than one stabilizer.

The base layer can have a lower weight percent polymer, such as polyvinyl chloride, than the amount of polymer in the second base layer. The base layer can have a lower weight percent plasticizer than the weight percent plasticizer in the second base layer. The base layer can have higher weight percent filler than the weight percent filler in the second base layer. The base layer can have a lower weight percent stabilizer than the weight percent stabilizer in the second base layer.

With respect to the second sheet, the second sheet can comprise at least one polymer, such as a polyvinyl chloride, at least one plasticizer, at least one filler, and, optionally, at least one stabilizer. Other optional ingredients can be included. The same choices of ingredients to form the first sheet can be used in forming the second sheet and, therefore, the various components are not repeated here. The components used to form the second sheet can be the same or different from the components used to form the first sheet, whether it is the base layer or second base layer, if present. The second sheet can comprise from 15 wt % to 30 wt % polymer, such as polyvinyl chloride, from 4 wt % to 10 wt % plasticizer, from 50 wt % to 70 wt % filler, and from 1 wt % to 5 wt % stabilizer. Other amounts for any of the first sheet, second sheet, or components forming the first sheet and second sheet can be varied and be above or below the ranges set forth herein.

Located optionally on the top surface of the print layer is an overlay. The overlay which can also be known as the wear layer can be an overlay paper or film (e.g., polymer film), which upon being affixed onto the print layer, is clear in appearance. The overlay paper can be a high abrasive overlay that can have aluminum oxide (or other wear resistant particles) embedded in the surface of the paper. In addition, the paper can be impregnated with an aminoplast resin (or other resin(s)) just as with the print layer. Various commercial grades of high abrasive overlays can be used such as those from Mead Specialty Paper with the product numbers TMO 361, 461 (70 gram/$m^2$ premium overlay from Mead), and 561 wherein these products have a range of Taber values of 4000 to 15000. The type of paper can have a weight of from about 20 to 60 g/$m^2$ such as 46 g/$m^2$ and a thickness of from about 0.05 to about 0.3 mm, such as about 0.13 mm.

The wear layer can be made of any suitable material known in the art for producing such wear layers. Preferably, the wear layer is a transparent poly(vinyl chloride) layer. The dry film thickness of this PVC layer is not critical and it is preferably from about 5 mils to 50 mils, and more preferably from about 10 mils to about 20 mils. Other examples of this wear layer include, but are not limited to, acrylic polymers, polyolefins, and the like. The wear layer can be a plasticized or a rigid polyvinyl chloride composition and/or other polymers, such as clear polymers. The wear layer topcoat can be a thermoset layer or a thermoplastic layer. Examples of such wear layers can be found in, for example, U.S. Pat. No. 4,333,987 to Kwart et al., U.S. Pat. No. 4,180,615 to Bettoli, U.S. Pat. No. 4,393,187 to Boba et al., and U.S. Pat. No. 4,507,188 to Chu. The wear layer top coat can be a hard, thermoset, radiation-curable acrylate monomers and or oligomers having a glass transition temperature (Tg) of greater than 50° C.

With respect to the overlay, the amount of aminoplast resin (or other resin(s)) can be from about 60 to about 140 g/$m^2$, such as from about 100 to about 120 g/$m^2$.

As an option, an underlay can be located and affixed between the bottom surface of the print layer and the top surface of the base layer. The underlay can be present and can be a paper impregnated with a resin(s), such as an aminoplast resin as described above. The underlay can be Kraft paper impregnated with a resin(s) such as aminoplast resins or phenolics, like phenolic formaldehyde resin or melamine formaldehyde resin. The resin(s) can be present in an amount of from about 60 g/$m^2$ to about 145 g/$m^2$, such as from about 100 g/$m^2$ to about 120 g/$m^2$ paper. The type of paper used can be from about 100 to 200 g/$m^2$, such as 145 g/$m^2$ and having a thickness of from 0.1 to 0.4 mm, like 0.25 mm. The underlay can be used when extra impact strength resistance is required. As an option, the underlay can be a film or sheet (such as a polymeric film or sheet using or comprising one or more of the polymers mentioned above for the base layer or other polymers, optionally with other additives, such as fillers, plasticizers, stabilizers, and the like).

The wear layer can comprise multiple layers, such as a wear layer and a wear layer top coat (or top coat layer). The wear layer top coat, (e.g. radition curable acrylates) can have a glass transition temperature of greater than 50° C., such as at least 67° C. The thickness of the wear layer top coat, once cured, can be from 0.1 mil to 2.5 mil, such as from 0.75 mil to 1.1 mil.

To achieve excellent scuff, scratch and abrasive wear resistance property, the combined wear layer base coat plus wear layer top coat dry film thickness can be at least 10 mil. The dry film thickness (DFT) is the thickness after curing. Additionally, to achieve excellent scuff, scratch and wear resistance, the wear layer top coats can have two layers of coating, both layers can be thermoset. The bottom wear layer and the outmost wear layer top coat possessing thermoset characteristics are due to sufficient cross-linking within the bottom of the respective wear layer and the outmost wear layer top coat polymeric networks. The wear layer and/or wear layer top coat can be each cross-linked sufficiently to be insoluble in methyl ethyl ketone, isopropyl alcohol and tetrahydrofuran.

The wear layer top coat can be, for example, a water based, solvent based, radiation-curable, non-radiation curable, UV-curable or non-UV curable system. For example, the wear layer top coat can be comprised of acrylics, acrylates, urethanes, epoxies, other type vinyls, other type polymers, and blends thereof, as long as the composition when cured, results in a flexible, thermoset coating with adequate cross-link density.

An optional strengthening layer can be present as one of the layers in the first sheet and/or second sheet, for instance using the chemistry described in U.S. Pat. No. 3,870,591 incorporated by reference. The strengthening layer can be a vinyl resin, such as a poly(vinyl chloride) homopolymer. Copolymers of vinyl chloride with minor amounts of other monomers, such as vinyl acetate, other vinyl esters and/or vinylidene chloride, may also be used.

Polymerizable cross-linking monomers in the strengthening layer can be the mono-, di-, tri- and tetrafunctional acrylates and methacrylates and blends thereof prepared by the esterification of the appropriate alcohols with acrylic or methacrylic acid, such as trimethylolpropane trimethacrylate. Other examples are trimethylolpropane triacrylate, pentaerythritol tetraacrylate, and pentaerythritol tetramethacrylate. Monofunctional and/or difunctional acrylates and methacrylates, such as 2-ethylhexyl acrylate, lauryl methacrylate, hexanediol diacrylate and diethylene glycol dimethacrylate, may be blended with the tri- and/or tetra-functional cross-linking monomer to reduce cross-link density.

A free radical catalyst can be used to initiate polymerization of the cross-linking monomer, such as an organic peroxide, like di-t-butyl peroxide. Other examples include other dialkyl peroxides, diacyl peroxides such as benzoyl peroxide, peroxyesters such as t-butyl perbenzoate, peroxydicarbonates such as di-2-ethylhexyl peroxydicarbonate, and hydroperoxides such as t-butyl hydroperoxide. The selection of the reactive monomer and polymerization catalyst can dictate the amount of cross-link density.

Other additives disclosed in U.S. Pat. No. 3,870,591 to Witman, such as plasticizers, stabilizers, pigments, dyes, fillers or other decorative elements may be added to the composition to be formed into the strengthening layer and/or any other layer comprising the plank. Optionally, besides the layers discussed above, one or more additional layers can be present, such as the layers described in U.S. Pat. No. 5,458,953, incorporated in its entirety by reference herein. Such additional layers include strengthening layers, additional foamable layers, and one or more wear layer base coat(s). The composition of these layers is described in U.S. Pat. No. 5,458,953 and can be used in the surface covering of the present invention.

In the present invention, one or more layers can contain wear resistant particles, such as a wear layer and/or wear top coat layer (e.g., protective layer). One example is at least one layer containing aluminum oxide. The aluminum oxide used in the present invention is also known as alumina or $Al_2O_3$. The aluminum oxide can be fused or calcined. The refractive index can be from about 1.4 to about 1.7.

A sufficient amount of the aluminum oxide and/or other wear resistant particles can be present in at least one layer of the surface covering to provide improved wear and/or stain resistance to a surface covering as compared to no aluminum oxide being present. Preferably, from about 2 $g/m^2$ to about 50 $g/m^2$, and more preferably from about 4 $g/m^2$ to about 20 $g/m^2$ of alumina can be present in at least one layer of the surface covering. Alternatively, from about 1% by weight to about 40% by weight of alumina can be present in at least one layer of the surface covering.

Also, while any source of aluminum oxide can be used, it is preferred that the aluminum oxide have the following characteristics: fused or calcined and having a hardness of from about 6 to about 9 on a Moh's scale, and most preferably about 9 on a Moh's scale. Preferably, the particle size of the aluminum oxide is from about 10 microns to about to about 70 microns, and more preferably from about 20 microns to about 50 microns. Sources for preferred aluminum oxide are Washington Mills, N. Grafton, Mass.; ALCOA Industrial Chemicals, Bauxite, Ark.; Composition Materials, Fairfield, Conn.; Micro Abrasives, Westfield, Mass.; and Alu Chem, Inc., Birmingham, Ala.

The aluminum oxide, which can be part of at least one layer of the surface covering, can be added in any manner known to those skilled in the art for adding particles to a layer. The aluminum oxide can be mixed into a wet coating or scattered on top of a wet coating. Preferably, the aluminum oxide is applied by a pellet dispenser which applies or sprinkles aluminum oxide on top of a layer which is still "wet" or uncured.

By the layer being "wet" or uncured, the aluminum oxide "sticks" or adheres to the "wet" layer and at least a portion of the aluminum oxide "sinks" into the layer and thus is not exposed to the environment.

The mixing of alumina (and/or other hard particles) with a formulation that forms the wet coating generally requires constant mixing of the coating with alumina to preferably keep the alumina suspended in the coating. Surface treatments of the alumina and the use of other anti-settling agents help in minimizing the settling.

Once the aluminum oxide is applied to the layer which is "wet" or uncured, the surface covering containing this layer is cured by means known to those skilled in the art, such as radiation curing, UV, electron beam, thermal and/or moisture curing, and the like.

Preferably, the aluminum oxide is present in the outermost layer of a surface covering which is the layer subjected to the environment including foot traffic and other objects coming in contact with the surface covering. Generally, this outermost layer is known as the top coat layer or wear layer top coat or protective layer. This wear layer top coat can be a polymeric layer, such as a thermoset or thermoplastic, and can be made of urethane or acrylic, melamine, polyvinylchloride, or polyolefins, and the like.

Acrylics, alkyd resins, melamines, conventional clear coats, polyvinyl chloride, polycarbonates, kevlar, epoxy coatings, polyester, polyester acrylates, vinyl-ether-functionalized urethane, epoxysiloxanes, epoxysilicones, multifunctional amine terminated acrylates, acrylate melamines, polyethylene and diene copolymers, and the like, can be used in place of the urethane based acrylates described above. Basically, the wear resistance of any surface or coating can be improved by the incorporation of hard particles such as fused alumina.

For instance, the planks can be coated with 0.3 to 2.5 mil of acrylated urethane based UV-curable top coat or other top coat formulations. On the wet coat in a typical application, about 5-15 g/m$^2$ of fused alumina with average particle size in the range of about 25-40 microns can be applied to this top coat by a modified Schilling Machine or by a Schilling scattering machine and then the top coat can be cured by UV-light (or other radiation curable source) employing either a direct or differential cure mechanism. Depending on the product specification, the amount of alumina and the thickness of the coating can be varied. Also, for example, from about 15 to about 35 g/m$^2$ of alumina (in a layer) in the particle size range of about 50 to about 150 microns could be used in the production of non-slip coverings.

Carborundum, quartz, silica (sand), glass, glass beads, glass spheres (hollow and/or filled), plastic grits, silicon carbide, diamond dust (glass), hard plastics, reinforced polymers and organics, etc., may be substituted for all or part of the alumina. The techniques and formulations described in U.S. Pat. No. 6,291,078 can be used herein and this patent is incorporated in its entirety by reference.

Figure 3:
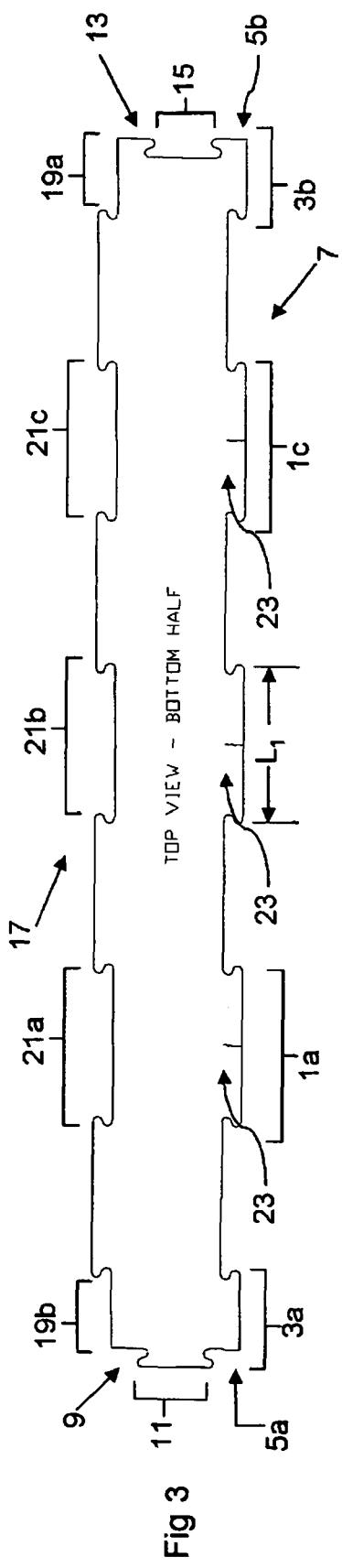
Figure 5:
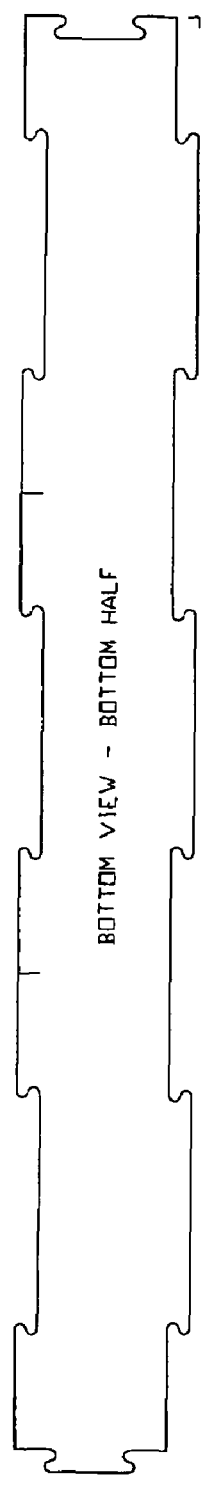
Figure 6:
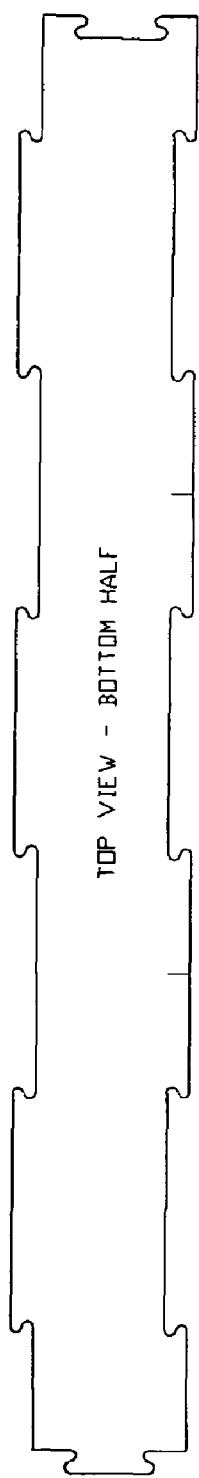
Figure 7:
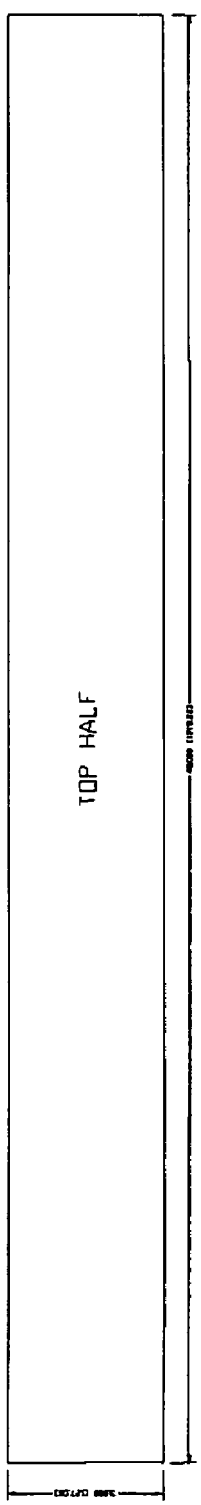
Figure 10:
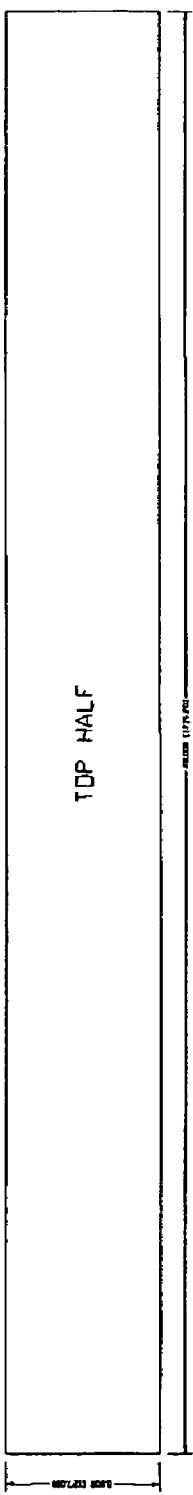
Figure 11:
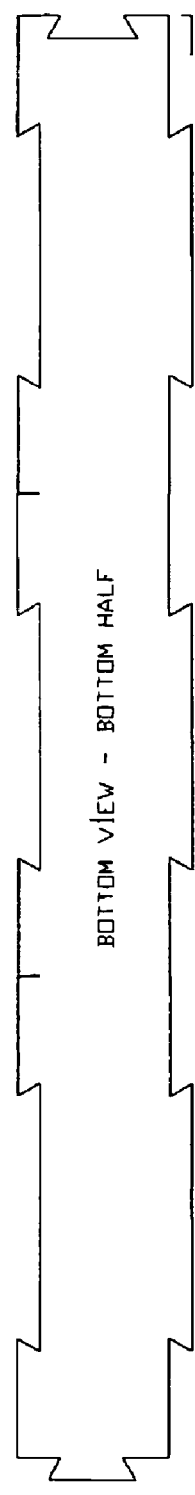
Figure 12:
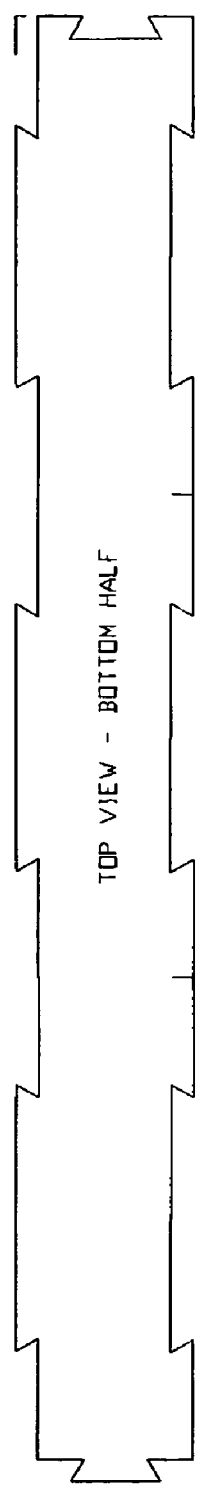
Figure 17:
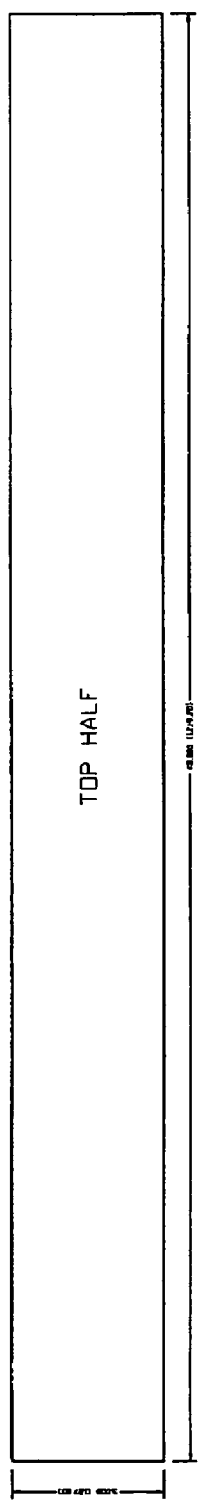
Figure 18:
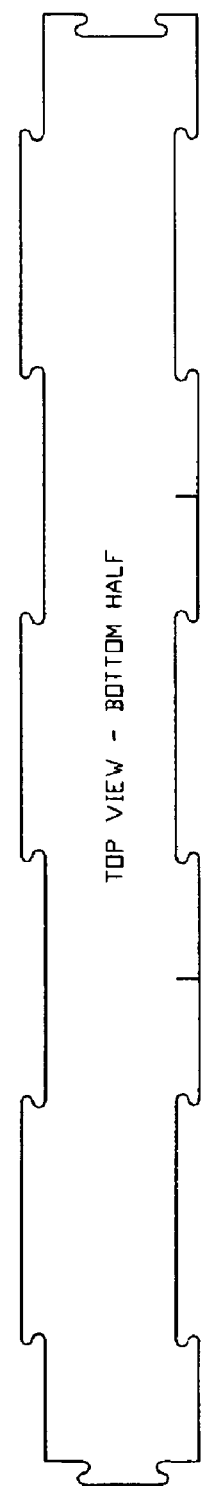
Figure 19:
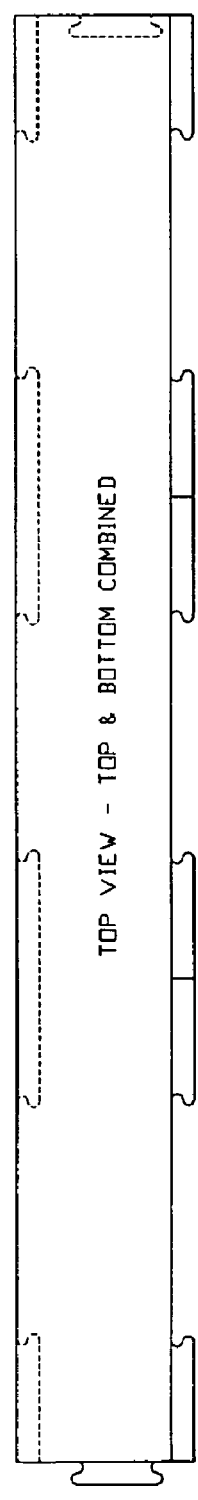
Figure 20:
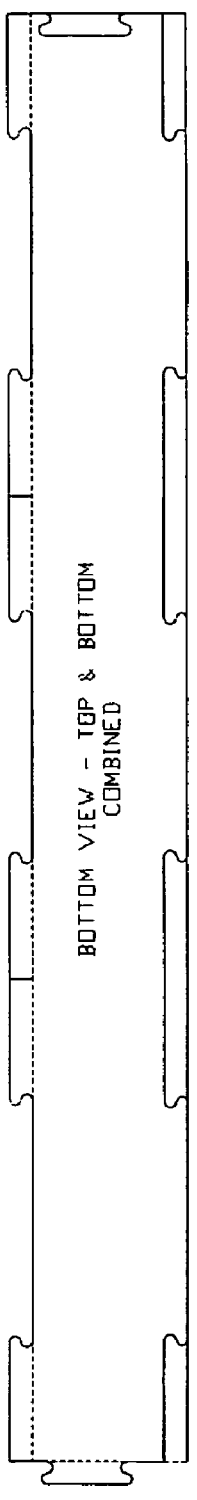
Figure 21:
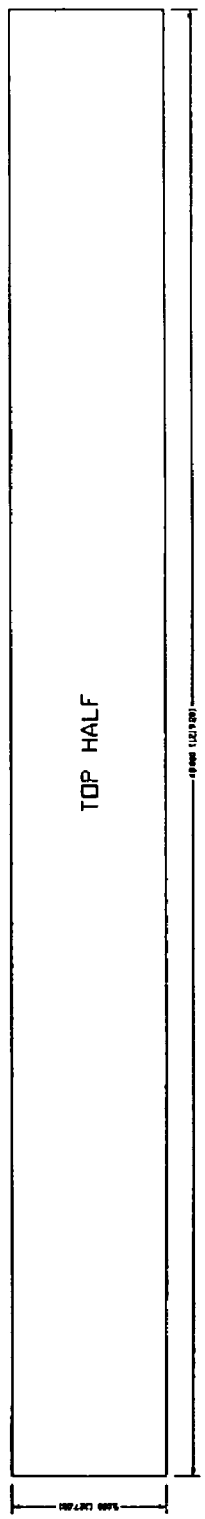
Figure 22:
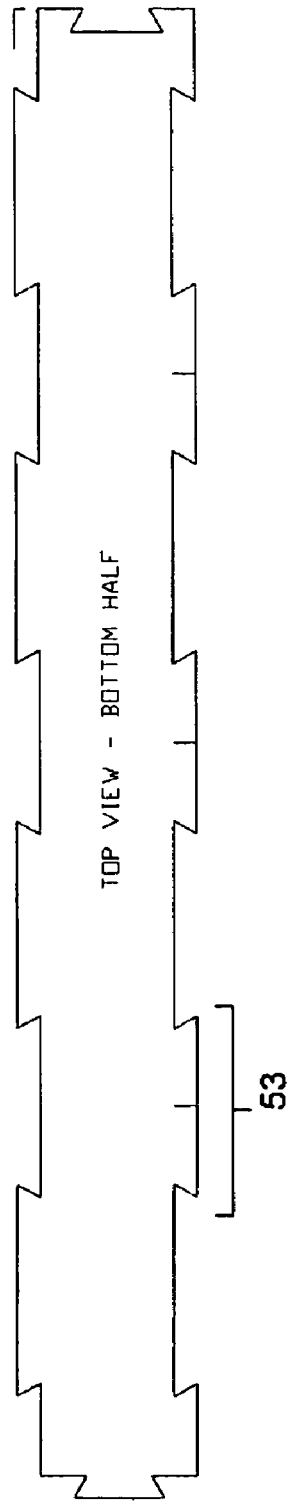
Figure 23:
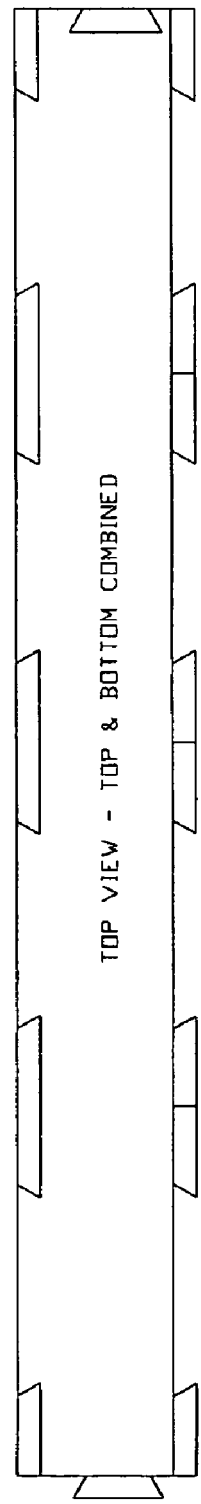
Figure 24:
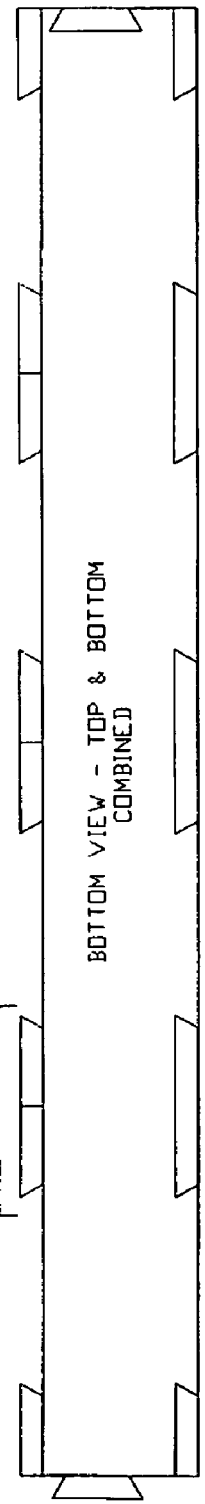
Figure 25:
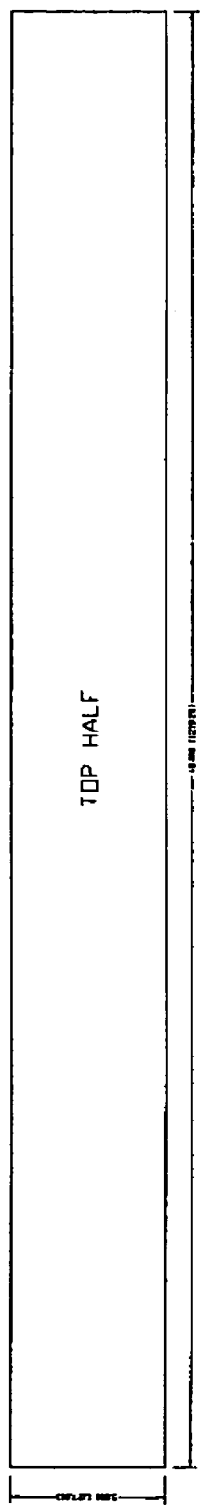
Figure 26:
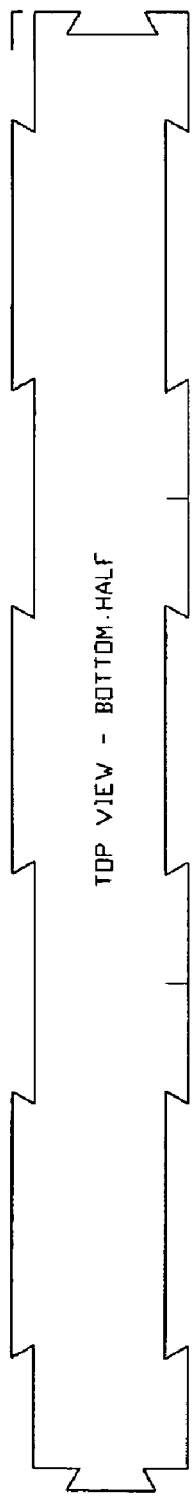
Figure 27:
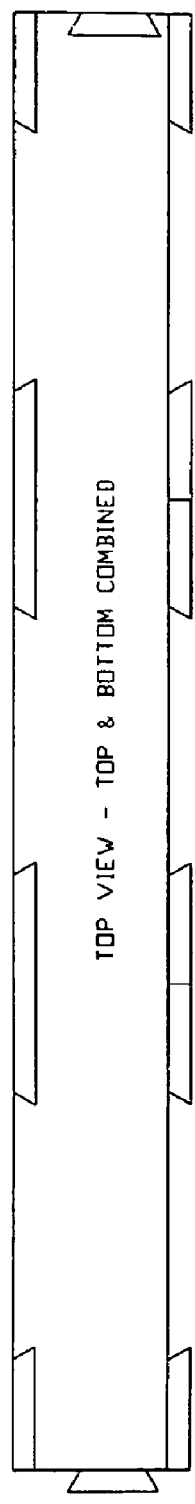
Figure 28:
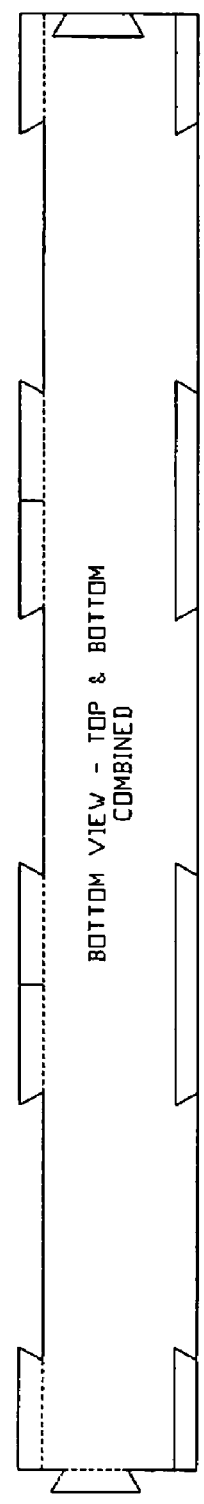
Figures 35, 36:
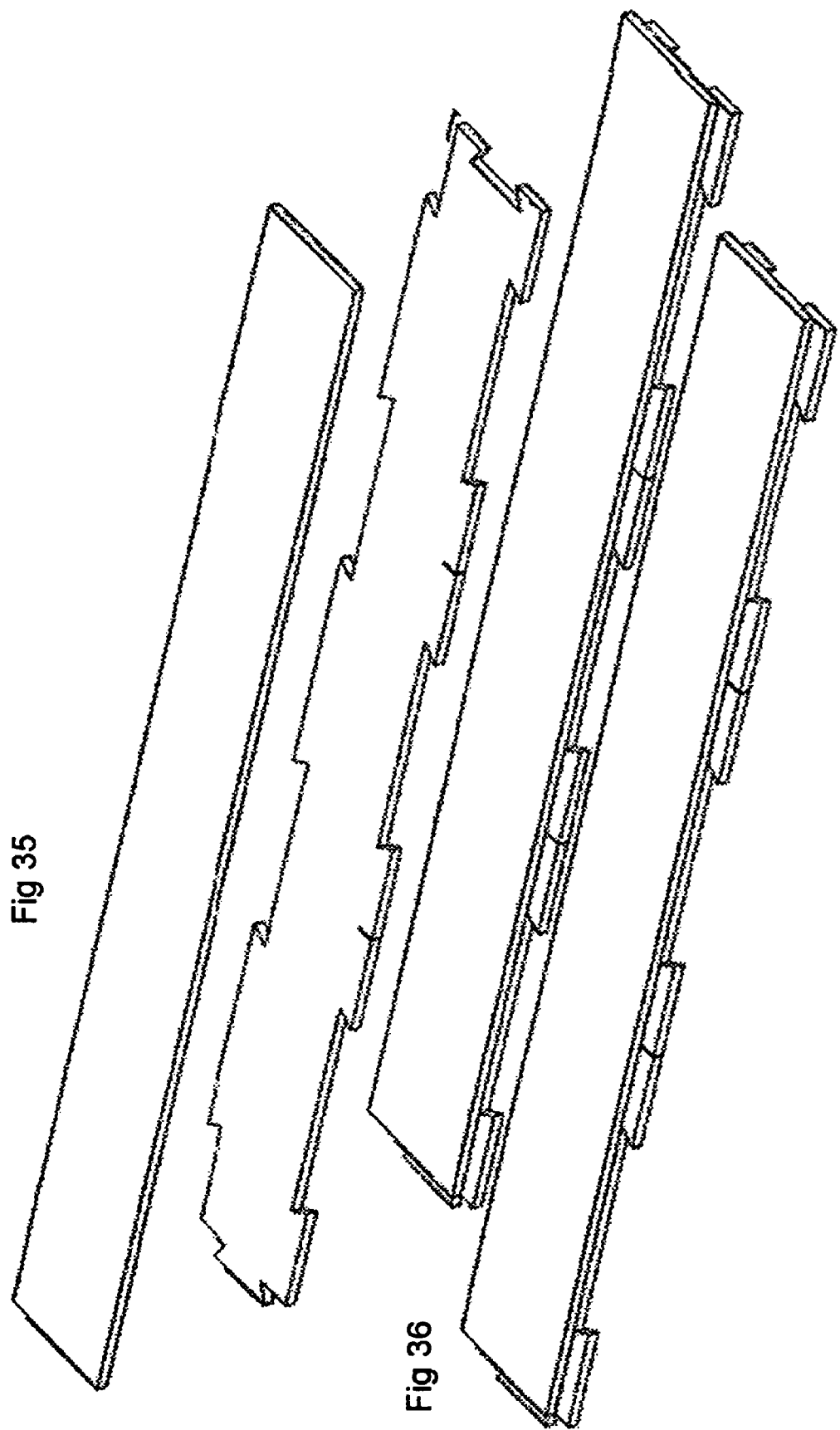

FIG. 1 shows an example of the first sheet (e.g., retangular in shape). FIG. 2 (bottom view) is an example of the second sheet or bottom sheet having the projections and recesses. FIG. 3 (top view) is an example of the second sheet of bottom sheet as well. FIGS. 4-6 are similar to FIGS. 1-3 respectively, but show a different length of plank. FIGS. 4-9 show the same types of features as FIGS. 1-3, respectively, except show a linear shaped projection and recess as described previously above. FIGS. 10-12 are similar to FIGS. 4-9 respectively, but show a different length of plank. FIG. 13 and FIG. 14 are similar to FIG. 1 and FIG. 3 respectively. FIG. 15 shows a top view and FIG. 16 shows a bottom view of the plank once the first sheet has been joined to the second sheet. In FIG. 15, note that the hash lines show how the recesses are not exposed and are concealed by the first sheet. Also note how the projections extend beyond the edges of the first sheet. These features are also shown in FIG. 16 from the bottom view where the recesses are visible due to the bottom view (e.g., looking from underneath of the plank). The adhesive (67) could be located on the bottom of the first sheet where the recesses (69) are located. FIGS. 17-20 are similar to FIGS. 13-16 respectively, but show a different length of plank. FIGS. 21-24 show the same types of features as FIGS. 13-16, respectively, except show a linear shaped projection/recess as previously described above. FIGS. 25-28 are similar to FIGS. 21-24, respectively, but show a different length of plank. FIG. 29 shows a 3-D type drawing of the first sheet (71) and second sheet (72) that are joined together. FIG. 31 and FIG. 32 are similar to FIG. 29 and FIG. 30 respectively and show the aligning of one plank to a second plank using the aligning mark. FIG. 33 shows the first sheet and second sheet prior to being adhered together. FIGS. 35 and 36 show similar features as FIGS. 33 and 34, respectively.

The floor planks of the present invention can be formed using a variety of methods. For instance, the first sheet that comprises the floor plank can be formed by individually pre-forming the base layer, the second base layer, if present, and/or any print layer that contains the print design. The wear layer can be present as an overlay wear layer or can be formed afterwards. The wear layer can include a protective layer, strengthening layer, and the like. Each of the base layers can be individually formed by calendar rolling, extrusion or other techniques once the formulation for each of the base layer(s) and/or optional second base layer(s) are prepared. Then, the layers that constitute the first sheet are placed on top of each other in their correct order and subjected to hot pressing using a hydraulic press. Under such pressure and temperature, this forms a consolidated first sheet. For instance, the temperature can range from 125° C. to 135° C. or other temperatures above or below this range. The pressure can be from 4 to 18 Mpa or other pressures above or below this range. Generally, the time that the pressure is applied is from 30 seconds to 2 minutes, such as from about 1 minute or any time above or below these ranges. Other consolidating techniques can be used. The consolidating to form the first sheet can be achieved with multiple first sheets in the hydraulic press. Furthermore, to achieve efficient use of resources, the various individual sheets that form the first sheet can be stacked together and then an embossing plate located above the wear layer and then a second set of components that form a first sheet can be placed on top of this embossing plate and so on, such that the hydraulic press can contain multiple first sheets to be consolidated with embossing plates separating each of these first sheets and, thus, during such a set-up, the consolidation of multiple first sheets can be obtained, as well as an embossing of each of the first sheets, which can be in register with the print design. The consolidation to form the first sheet can be a large sheet that can be cut up into desired final dimensions of the floor plank. For instance, during this hot pressing, the overall sheets can be 1 m×1 m or larger or smaller. Once the hot pressing to form the consolidated first sheet is achieved, the first sheets are then annealed to remove stress and achieve dimensional stability. The annealing can occur in an oven or other heating device. The annealing can occur at a temperature of from 125° C. to 135° C. This annealing can be done on a conveyor belt, through an infared oven or conventional air impinged oven, the speed can be any suitable speed depending upon the length of the oven and the temperature setting. For instance, the speed of the conveyor belt can be 3 m to 10 m per minute, such as 3½ to 8 m per minute. Afterwards, the first sheet can be aged at ambient conditions, such as 25° C., for various hours, such as 1 day, 2 days, 3 days, or more. Afterwards, the first sheet can be cut or punched out to plank sizes. Further, the second sheet can be prepared in the same manner with the same or different conditions and subjected to hot pressing, annealing, aging, and then punched out with the projections and cut-outs, and also, if desired, the punch-out step can include punching an aligning mark on one or more of the projections. Once the first sheet and second sheet are formed, adhesive can be applied to the top surface of the second sheet and/or to the bottom surface of the first sheet. The adhesive can be a pressure sensitive adhesive, or other adhesive, such as an acrylic adhesive, vinyl acetate, epoxy, styrene butadiene, latex, ethylene-acetate, polybutene, urethane and/or rubber, and the like. Then, the first sheet and the second sheet are adhered together in register and subjected to a pressing operation to ensure preferably full contact between all surfaces to make a unitary floor plank. A cold press can be used, meaning no heat is applied. Then, as an option, a top coat layer or protective layer, like a UV protective layer, optionally containing wear resistant particles, such as aluminum oxide or other wear resistant particles can be applied, such as by means of a spray coating operation, roller coating operation, or air knife coater or, curtain coater and the like. The cold pressing operation can use various pressures, such as from 10 to 100 kg or more, and for a time, such as 1 hour to 3 days, such as about 24 hours.

The present invention further relates to a floor formed by connecting two or more floor planks together using the mechanical lock system of the present invention. The present invention further relates to a method of connecting various pieces of floor plank together to form a surface covering. Unlike laminate flooring, an advantage of the present invention is that to form a connected floor system, one does not need to angle a floor plank into a groove profile. Furthermore, unlike laminate flooring, one does not need to lift previously connected pieces in order to install a new piece which can be very typical with many laminate flooring profiles. With the present invention, the long edge (or side) or the short edge (or side) can be installed first without any problem or need to lift or move a previously-installed flooring plank. Furthermore, with the present invention, if a plank is mis-installed for any reason or if the floor needs to be lifted, the planks can be separated from each other using some pull force, but the floors can be reconnected and essentially maintain the same connecting strength that previously existed.

The present invention will be further clarified by the following examples, which are intended to be exemplary of the present invention.

EXAMPLES

Various floor planks of the present invention were made. The formulations are set forth in the tables below.

TABLE 1

| Thickness of each layer in mm | AlOx-PU Protective Layer | Clear Wear Layer | Print Layer | Base Layer | Second Base Layer | Second Sheet | Adhesive |
|---|---|---|---|---|---|---|---|
| 5" × 48" × 4 mm | 0.03 mm | 0.4 mm | 0.08 mm | (#1) 1.0 mm | (#1) 1.0 mm | (#3) 1.45 mm | 0.04 mm |
| 4" × 36" × 4 mm | 0.03 mm | 0.1 mm | 0.08 mm | (#1) 1.15 mm | (#1) 1.15 mm | (#3) 1.45 mm | 0.04 mm |

TABLE 2

Formulations *

| Ingredients | Base Layer #1 | Base Layer #2 | Base Layer #3 | Second Sheet #3 |
|---|---|---|---|---|
| PVC | 19% | 32.5% | 24% | 24% |
| DINP Plasticizer | 6.1% | 10.4% | 7.7% | 7.7% |
| CaCO$_3$ Filler | 74% | 52.1% | 65.9% | 65.9% |
| Ca—Zn Stabilizer | 1% | 5% | 2.4% | 2.4% |

* all in wt %

A Product #1 and Product #2 were made based on the formulations and layers in Tables 1 and 2 above.

The base layer and second base layer formulations were prepared by Barbury mixing and were then formed by 4 roll calendar rolling by slitting into 1 m×1 m size. Similarly, the second base layer was formed by calendar rolling using the same conditions. The second sheet was also formed by calendar rolling using the same conditions.

Then, a composite of the first sheet was formed by taking the second base layer, putting the first base layer on top of the second base layer, and putting the print décor layer on top, wherein the print decor layer in this example had the print design of a wood board and then a wear layer overlay of clear PVC film. The decor layer was formed of a printed PVC film. Then, the various layers forming the first sheet were put in a hydraulic press with an embossing plate with the embossing side facing the décor layer. One press operation can normally press out multiple panels with the same three other first sheets, each layer of sheets is separated by an embossing plate. Then, the various first sheets were pressed through a hydraulic press at a temperature of from about 125° C. to 135° C. with a pressure of 4 to 18 Mpa for about 60 seconds. Then, the consolidated first sheets were annealed at a temperature of from 125° C. to about 135° C. for about 1 minute. Then, the first sheets were aged in ambient conditions (25° C.) for 72 hours and then punched into plank sizes having a length of 48" or 36" and a width of 5" or 4". The second sheet was made in the same manner with the same conditions. The second sheet was then punched out into the projections and cut-outs that match the dimensions set forth in FIG. 3. Then, pressure sensitive adhesive was applied to the surface of the first sheet and the second sheet was then applied in register and cold-pressed at a pressure of about 50 kg for 24 hours. Then, a UV protective layer having aluminum oxide wear resistant particles was applied onto the embossed wear layer.

The floor plank had each of the properties previously described.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A floor plank comprising:
   a) a first sheet having four sides, the first sheet having an upper surface and a lower surface and said first sheet comprising at least one base layer, a print design located above said base layer, and at least one wear layer located above said print design; and
   b) a second sheet having multiple sides and having an upper surface and a lower surface, the upper surface of the second sheet being adhered to the lower surface of the first sheet; wherein two adjacent sides of the second sheet has multiple projections to interlock with recesses from at least one adjacent floor plank and two other adjacent sides have recesses to interlock with projections from at least one adjacent floor plank;

wherein said projections and recesses have a complementary shape to each other to be interlockingly engageable with corresponding recesses or projections on an adjacent floor plank;
wherein the multiple projections of said two adjacent sides of the second sheet extend beyond two adjacent sides of the first sheet and the recesses of said two other adjacent sides of the second sheet do not extend beyond said first sheet and are concealed by said first sheet;
wherein at least a portion of the lower surface of the first sheet that is located directly above said recesses have at least one adhesive coating that permits adhesion of an upper surface of a projection from an adjacent floor plank or the upper surfaces of the projections have an adhesive coating or both, wherein said floor plank having one or more of the following mechanical properties:
i. Tensile strength (psi)—ASTM D638: 750 psi +/−55 psi;
ii. Elongation (%)—ASTM D638: 34+/−9;
iii. Break Load (lbf)—ASTM D638: 31+/−1.5;
iv. Flexural Force @ 0.3" (lbf)—Modified ASTM D790: 1+/−0.35;
v. Pneumatic Indentation at 3000 psi (inch)—<0.005; and/or
vi. Residual Indentation at 750 psi (inch)—ASTM F-970: <0.002.

2. The floor plank of claim 1, wherein said floor plank on a first side has at least two full projections and at least two separated partial projections, wherein two of the at least two separated partial projections are respectively located at each adjacent corner of said one side.

3. The floor plank of claim 2, wherein said floor plank on a second side has one projection and on a third side has one recess.

4. The floor plank of claim 3, wherein said floor plank on a fourth side has at least two full recesses and at least two separated partial recesses, wherein two of the at least two separated partial recesses are respectively located at each adjacent corner of said fourth side.

5. The floor plank of claim 1, wherein said floor plank has two opposing longer sides and two opposing shorter sides.

6. The floor plank of claim 4, wherein said floor plank has two opposing longer sides and two opposing shorter sides, and said second side and said third side are the two opposing shorter sides.

7. The floor plank of claim 1, wherein said interlockingly engageable mechanically interlocks two adjacent floor planks together to prevent horizontal movement of the floor plank in two directions that are perpendicular to each other and wherein said two directions are parallel to the plane of the upper surface of said floor plank.

8. The floor plank of claim 1, wherein said upper surface of said first sheet is texture embossed in register with said print design.

9. The floor plank of claim 1, wherein each recess defines a surface area and each projection defines a surface area and wherein said surface area defined by said recess is larger than said surface area defined by said projection.

10. The floor plank of claim 9, wherein said surface area defined by said recess is from 1% to 5% larger than said surface area defined by said projection.

11. The floor plank of claim 1, wherein each projection has an overall length of from 3 to 5 inches.

12. The floor plank of claim 1, wherein each projection has an overall length of from 5 to 7 inches.

13. The floor plank of claim 1, wherein each projection has a dove-tail shape.

14. The floor plank of claim 1, wherein said base layer comprises at least one polymer.

15. The floor plank of claim 1, wherein said print design has a design pattern that resembles natural wood.

16. The floor plank according to claim 1, wherein one or more projections comprise a visible aligning mark in order to align interlocking of an adjacent floor plank.

17. The floor plank according to claim 4, wherein one or more projections comprise a visible aligning mark in order to align interlocking of an adjacent floor plank.

18. The floor plank according to claim 1, wherein the projections and recessions are evenly spaced.

19. The floor plank according to claim 1, wherein the projections comprise structures adapted to mechanically lock the floor plank to an adjacent floor plank having corresponding engagement elements.

20. The floor plank according to claim 1, wherein the projection has a bow-tie shape, T-shaped.

21. The floor plank according to claim 1, wherein the projections are unitary with the second sheet.

22. The floor plank according to claim 1, wherein the projections or recesses or both are separately attached to the second sheet.

23. The floor plank according to claim 1, wherein the thickness of the first sheet is from 1.5 mm to 3 mm and the thickness of the second sheet is from 1 mm to 2 mm.

24. The floor plank of claim 1 having one or more of the following de-lamination properties:
a de-lamination force between the first sheet and second sheet based on modified ASTM D3164 having a shear bond (lbf): 30+/−6 and/or a peel bond (lbf): 4.5+/−0.5.

25. The floor plank of claim 1, wherein said first sheet further comprising a second base layer located below and adhered to said base layer.

26. The floor plank of claim 25, wherein said base layer comprising polyvinyl chloride, at least one plasticizer, at least one filler, and at least one stabilizer, and said second base layer comprising polyvinyl chloride, at least one plasticizer, at least one filler, and at least one stabilizer, wherein components in base layer and components in second base layer are the same or different.

27. The floor plank of claim 25, wherein said second base layer comprising from 25 wt % to 40 wt % polyvinyl chloride, from 7 wt % to 15 wt % plasticizer, from 40 wt % to 60 wt % filler, and from 2 wt % to 10 wt % stabilizer.

28. The floor plank of claim 1, wherein said second sheet comprising polyvinyl chloride, at least one filler, and at least stabilizer; said second sheet comprising 15 wt % to 30 wt % polyvinyl chloride, from 4 wt % to 10 wt % plasticizer, from 50 wt % to 75 wt % filler, and from 1 wt % to 5 wt % stabilizer.

29. The floor plank of claim 1, further comprising at least one protective top coat layer located on top of said wear layer.

30. The floor plank of claim 1, further comprising at least one protective layer top coat layer having wear resistant particles located on top of said wear layer.

31. A floor plank comprising:
a) a first sheet having four sides, the first sheet having an upper surface and a lower surface and said first sheet comprising at least one base layer, a print design located above said base layer, and at least one wear layer located above said print design; and
b) a second sheet having multiple sides and having an upper surface and a lower surface, the upper surface of the second sheet being adhered to the lower surface of the first sheet;
wherein two adjacent sides of the second sheet has multiple projections to interlock with recesses from at least one adjacent floor plank and two other adjacent sides have recesses to interlock with projections from at least one adjacent floor plank;

wherein said projections and recesses have a complementary shape to each other to be interlockingly engageable with corresponding recesses or projections on an adjacent floor plank;

wherein the multiple projections of said two adjacent sides of the second sheet extend beyond two adjacent sides of the first sheet and the recesses of said two other adjacent sides of the second sheet do not extend beyond said first sheet and are concealed by said first sheet;

wherein at least a portion of the lower surface of the first sheet that is located directly above said recesses have at least one adhesive coating that permits adhesion of an upper surface of a projection from an adjacent floor plank or the upper surfaces of the projections have an adhesive coating or both, wherein the floor plank having a joint strength when two floor planks are interlocked together based on modified ASTM D3164, of:

a. Adhesive bond (1" sample—lbf): 11+/−4;
b. Mechanical & adhesive bond (full side Lock—lbf): 50+/−18;
c. Mechanical & adhesive bond (full end Lock—lbf): 33+/−15; and/or
d. Partial mechanical & adhesive Bond (1" sample—lbf): 7+/−2.

32. A floor plank comprising:

a first sheet having four sides, the first sheet having an upper surface and a lower surface and said first sheet comprising at least one base layer, a print design located above said base layer, and at least one wear layer located above said print design; and a second sheet having multiple sides and having an upper surface and a lower surface, the upper surface of the second sheet being adhered to the lower surface of the first sheet; wherein two adjacent sides of the second sheet has multiple projections to interlock with recesses from at least one adjacent floor plank and two other adjacent sides have recesses to interlock with projections from at least one adjacent floor plank;

wherein said projections and recesses have a complementary shape to each other to be interlockingly engageable with corresponding recesses or projections on an adjacent floor plank;

wherein the multiple projections of said two adjacent sides of the second sheet extend beyond two adjacent sides of the first sheet and the recesses of said two other adjacent sides of the second sheet do not extend beyond said first sheet and are concealed by said first sheet;

wherein at least a portion of the lower surface of the first sheet that is located directly above said recesses have at least one adhesive coating that permits adhesion of an upper surface of a projection from an adjacent floor plank or the upper surfaces of the projections have an adhesive coating or both;

wherein the floor plank has the following mechanical properties:

a. Tensile strength (psi)—ASTM D638: 750 psi +/−55 psi;
b. Elongation (%)—ASTM D638: 34+/−9;
c. Break Load (lbf)—ASTM D638: 31+/−1.5;
d. Flexural Force @ 0.3" (lbf)—Modified ASTM D790: 1+/−0.35;
e. Pneumatic Indentation at 3000 psi (inch)—<0.005; and/or
f. Residual Indentation at 750 psi (inch)—ASTM F-970: <0.002;

and wherein the floor plank the following de-lamination properties:

a de-lamination force between the first sheet and second sheet based on modified ASTM D3164 having a shear bond (lbf): 30+/−6 and/or a peel bond (lbf): 4.5+/−0.5;

and wherein the floor plank has a joint strength when two floor planks are interlocked together based on modified ASTM D3164, of:

g. Adhesive bond (1" sample—lbf): 11+/−4;
h. Mechanical & adhesive bond (full side Lock—lbf): 50+/−18;
i. Mechanical & adhesive bond (full end Lock—lbf): 33+/−15; and/or
j. Partial mechanical & adhesive Bond (1" sample—lbf): 7+/−2; and wherein the floor plank has one or more of the following surface properties:

k. Taber Abrasion-NAFLA 33.13 LF01-2003-Wear 3.7: >350 cycles;
l. Scratch resistance by fine steel wool—not visible;
m. Scuff by sneaker sole—no scuff mark;
n. Stain property—Modified ASTM 925: 0-3 (no stain-strong stain):
   i. Food stains: 0
   ii. Asphalt sealer: 0
   iii. Oil dye: 1
   iv. Shoe Polish: 1
   v. Blue Sharpie Marker: 1
   vi. Fertilizer: 0
   vii. Iodine: 3;
o. Heat & light stability—ASTM 1514 & 1515: Delta E<3; and/or
p. C.O.F (dry neolite sole)—ASTM C1028: >0.6.

33. A floor plank comprising:

a) a first sheet having four sides, the first sheet having an upper surface and a lower surface and said first sheet comprising at least one base layer, a print design located above said base layer, and at least one wear layer located above said print design; and b) a second sheet having multiple sides and having an upper surface and a lower surface, the upper surface of the second sheet being adhered to the lower surface of the first sheet; wherein two adjacent sides of the second sheet has multiple projections to interlock with recesses from at least one adjacent floor plank and two other adjacent sides have recesses to interlock with projections from at least one adjacent floor plank;

wherein said projections and recesses have a complementary shape to each other to be interlockingly engageable with corresponding recesses or projections on an adjacent floor plank;

wherein the multiple projections of said two adjacent sides of the second sheet extend beyond two adjacent sides of the first sheet and the recesses of said two other adjacent sides of the second sheet do not extend beyond said first sheet and are concealed by said first sheet;

wherein at least a portion of the lower surface of the first sheet that is located directly above said recesses have at least one adhesive coating that permits adhesion of an upper surface of a projection from an adjacent floor plank or the upper surfaces of the projections have an adhesive coating or both, wherein said base layer comprising from 15 wt % to 30 wt % polyvinyl chloride, from 4 wt % to 10 wt % plasticizer, from 50 wt % to 80 wt % filler, and from about 1 wt % to 5 wt % stabilizer.

34. A floor plank comprising:
a) a first sheet having four sides, the first sheet having an upper surface and a lower surface and said first sheet comprising at least one base layer, a print design located above said base layer, and at least one wear layer located above said print design; and
b) a second sheet having multiple sides and having an upper surface and a lower surface, the upper surface of the second sheet being adhered to the lower surface of the first sheet; wherein two adjacent sides of the second sheet has multiple projections to interlock with recesses from at least one adjacent floor plank and two other adjacent sides have recesses to interlock with projections from at least one adjacent floor plank;
wherein said projections and recesses have a complementary shape to each other to be interlockingly engageable with corresponding recesses or projections on an adjacent floor plank;
wherein the multiple projections of said two adjacent sides of the second sheet extend beyond two adjacent sides of the first sheet and the recesses of said two other adjacent sides of the second sheet do not extend beyond said first sheet and are concealed by said first sheet;
wherein at least a portion of the lower surface of the first sheet that is located directly above said recesses have at least one adhesive coating that permits adhesion of an upper surface of a projection from an adjacent floor plank or the upper surfaces of the projections have an adhesive coating or both,
wherein said first sheet further comprising a second base layer located below and adhered to said base layer, and
wherein said base layer has a lower wt % polyvinyl chloride than said second base layer; said base layer has a lower wt % plasticizer than said second base layer; second base layer has a higher wt % filler than said second base layer; and said base layer has a lower wt % stabilizer than said second base layer.

* * * * *